US007412210B2

(12) United States Patent
Okuyama

(10) Patent No.: US 7,412,210 B2

(45) Date of Patent: Aug. 12, 2008

(54) HIGH FREQUENCY MODULE

(75) Inventor: Yuichiro Okuyama, Tokyo (JP)

(73) Assignee: TDK Corporation, Tokyo (JP)

( * ) Notice: Subject to any disclaimer, the term of this patent is extended or adjusted under 35 U.S.C. 154(b) by 239 days.

(21) Appl. No.: 11/451,563

(22) Filed: Jun. 13, 2006

(65) Prior Publication Data

US 2006/0286942 A1 Dec. 21, 2006

(30) Foreign Application Priority Data

Jun. 16, 2005 (JP) ............................ 2005-176205

(51) Int. Cl.
*H04B 1/44* (2006.01)

(52) U.S. Cl. .......................... 455/78; 455/80; 333/126; 333/133

(58) Field of Classification Search ...................... None
See application file for complete search history.

(56) References Cited

U.S. PATENT DOCUMENTS

| | | | | | |
|---|---|---|---|---|---|
| 5,561,406 | A * | 10/1996 | Ikata et al. | .................. | 333/126 |
| 5,815,804 | A | 9/1998 | Newell et al. | | |
| 6,380,823 | B1 | 4/2002 | Ikata et al. | | |
| 2004/0224643 | A1 * | 11/2004 | Nakai | .......................... | 455/78 |
| 2006/0192632 | A1 * | 8/2006 | Nakai et al. | ................. | 333/133 |

FOREIGN PATENT DOCUMENTS

| | | | |
|---|---|---|---|
| EP | 1 107 346 | A2 | 6/2001 |
| EP | 1 152 543 | A1 | 11/2001 |
| JP | A 10-145270 | | 5/1998 |
| JP | A 2002-64400 | | 2/2002 |
| JP | A 2003-152588 | | 5/2003 |
| JP | A 2004-147300 | | 5/2004 |

* cited by examiner

*Primary Examiner*—Thanh C Le
(74) *Attorney, Agent, or Firm*—Oliff & Berridge, PLC

(57) ABSTRACT

A high frequency module comprises: a switch circuit connected to first and second antenna terminals; a first diplexer connected to first and second reception signal terminals and the switch circuit; a second diplexer connected to first and second transmission signal terminals and the switch circuit; and a layered substrate for integrating these components. The layered substrate includes a first region and a second region that are divided from each other by an imaginary plane that passes through the center of the bottom surface of the layered substrate and that intersects the bottom surface at a right angle. The first diplexer is located in the first region while the second diplexer is located in the second region. The locations of the first antenna terminal and the first and second reception signal terminals and the locations of the second antenna terminal and the first and second transmission signal terminals are symmetric with respect to the imaginary plane.

10 Claims, 19 Drawing Sheets

HIGH FREQUENCY MODULE

BACKGROUND OF THE INVENTION

1. Field of the Invention

The present invention relates to a high frequency module used in a communications apparatus for a wireless local area network (LAN), for example.

2. Description of the Related Art

Attention has been recently drawn to a wireless LAN that forms a LAN through the use of radio waves as a technique for constructing a network easily. A plurality of standards are provided for the wireless LAN, such as the IEEE 802.11b and the IEEE 802.11g that use a 2.4 GHz band as a frequency band and the IEEE 802.11a that uses a 5 GHz band as a frequency band. It is therefore required that communications apparatuses used for the wireless LAN conform to a plurality of standards.

Furthermore, the communications status on the wireless LAN varies depending on the location of the communications apparatus and the environment. It is therefore desirable to adopt a diversity for choosing one of a plurality of antennas whose communications status is best.

In the communications apparatus for the wireless LAN, a circuit portion that is connected to antennas and processes high frequency signals (the portion is hereinafter called a high frequency circuit section) is incorporated in a card-shaped adapter, for example. In addition, it is expected that the communications apparatus for the wireless LAN be installed in a mobile communications device such as a cellular phone. A reduction in size of the high frequency circuit section is therefore desired.

A type of mobile communications device such as a cellular phone is known, wherein a high frequency circuit section is formed as a module operable in a plurality of frequency bands. For example, Japanese Published Patent Application 2003-152588 discloses a module incorporating two diplexers and a single switch circuit. In this module the switch circuit switches one of the two diplexers to be connected to a single antenna. Each of the diplexers separates two signals in different frequency bands from each other.

Japanese Published Patent Application 10-145270 discloses a high frequency switch provided for a diversity that enables a transmission port and a reception port to be each switched to be connected to one of two antennas.

Japanese Published Patent Application 2002-64400 discloses a high frequency switch module operable in two frequency bands. This high frequency switch module comprises: a first switch circuit for switching transmission signals and reception signals of a first transmission/reception system; a first low-pass filter circuit connected to a transmission path of the first switch circuit; a second switch circuit for switching transmission signals and reception signals of a second transmission/reception system; a second low-pass filter circuit connected to a transmission path of the second switch circuit; a separator circuit for separating the first and second transmission/reception systems; and a layered structure for integrating the foregoing circuits.

Japanese Published Patent Application 2002-64400 discloses that transmission terminals and reception terminals are located in separate regions from each other with respect to a center line of the layered structure and that the arrangement of the transmission terminals and the reception terminals is line-symmetric. In addition, this publication discloses that, when antenna terminals, the transmission terminals and the reception terminals are called high frequency terminals, ground terminals are respectively disposed between adjacent ones of the high frequency terminals.

As described above, it is desirable that the communications apparatus for the wireless LAN conform to a plurality of standards whose operable frequency bands are different. It is therefore desired that the high frequency circuit section of the communications apparatus for the wireless LAN be capable of processing transmission signals and reception signals in a plurality of frequency bands. In addition, it is preferred that the communications apparatus for the wireless LAN adopt a diversity. Because of this, the high frequency circuit section of the communications apparatus for the wireless LAN preferably has a function of switching a plurality of antennas to be connected to an output port of reception signals and an input port of transmission signals. Furthermore, a reduction in size of the high frequency circuit section of the communications apparatus for the wireless LAN is desired.

In the module disclosed in Japanese Published Patent Application 2003-152588, a transmission circuit for processing transmission signals and a reception circuit for processing reception signals are placed inside a layered structure. As a result, there sometimes occurs electromagnetic coupling between the transmission circuit and the reception circuit in such a module. If such coupling is established, there occurs a problem that transmission signals leak from the transmission circuit to the reception circuit and/or reception signals leak from the reception circuit to the transmission circuit, and the isolation between the transmission circuit and the reception circuit is thereby degraded. This problem becomes more noticeable as the module is reduced in size. The problem therefore interferes with a reduction in size of the module.

In the module disclosed in Japanese Published Patent Application 2003-152588, no specific consideration is given to the arrangement of the terminals connected to the antennas and the terminals for receiving and outputting signals. In this case, it is difficult to separate the transmission circuit and the reception circuit from each other and it is therefore difficult to improve the isolation between the transmission circuit and the reception circuit. In this case, furthermore, it is required to separately design the transmission circuit and the reception circuit to be placed inside the layered structure, and it thus takes a longer period of time to design the transmission circuit and the reception circuit. Moreover, there tends to be unwanted portions of transmission lines provided in the layered structure, and it is therefore likely that loss and noise occurring in the module increase.

As previously described, Japanese Published Patent Application 2002-64400 discloses that the transmission terminals and the reception terminals are arranged in line-symmetry. However, this publication does not mention any specific consideration for the positional relationship between the transmission and reception circuits and the transmission and reception terminals. It is therefore difficult to solve the foregoing problems even if the technique disclosed in this publication is used.

OBJECT AND SUMMARY OF THE INVENTION

It is an object of the invention to provide a high frequency module that is capable of processing transmission signals and reception signals in a plurality of frequency bands and that achieves a reduction in size and an improvement in characteristic.

A high frequency module of the invention comprises: a first antenna terminal and a second antenna terminal that are connected to separate antennas; a first reception signal terminal for outputting a reception signal in a first frequency band; a second reception signal terminal for outputting a reception signal in a second frequency band higher than the first frequency band; a first transmission signal terminal for receiving a transmission signal in the first frequency band; a second transmission signal terminal for receiving a transmission signal in the second frequency band; a switch circuit connected to the first and second antenna terminals; a first diplexer connected to the first and second reception signal terminals and the switch circuit and separating the reception signal in the first frequency band and the reception signal in the second frequency band from each other; a second diplexer connected to the first and second transmission signal terminals and the switch circuit and separating the transmission signal in the first frequency band and the transmission signal in the second frequency band from each other; and a layered substrate including dielectric layers and conductor layers alternately stacked and integrating the foregoing components.

In the high frequency module of the invention, the switch circuit is provided for connecting one of the first and second diplexers to one of the first and second antenna terminals. The first and second diplexers are provided inside the layered substrate. The foregoing terminals are located on a surface of the layered substrate. The layered substrate includes a first region and a second region that are divided from each other by an imaginary plane that passes through the center of a bottom surface of the layered substrate and that intersects the bottom surface of the layered substrate at a right angle. The first diplexer, the first antenna terminal, the first reception signal terminal and the second reception signal terminal are located in the first region. The second diplexer, the second antenna terminal, the first transmission signal terminal and the second transmission signal terminal are located in the second region. Locations of the first and second antenna terminals, locations of the first reception signal terminal and the first transmission signal terminal, and locations of the second reception signal terminal and the second transmission signal terminal are symmetric, respectively, with respect to the imaginary plane.

The high frequency module of the invention may further comprise a first control terminal and a second control terminal receiving first and second control signals for switching a state of the switch circuit. In this case, the first control terminal is located in the first region, and the second control terminal is located in the second region. In addition, the first and second control terminals are placed at locations symmetric with respect to the imaginary plane.

The high frequency module of the invention may further comprise a plurality of non-input/output terminals that are not used for inputting and outputting signals and that are respectively located between adjacent ones of the terminals on the surface of the layered substrate.

In the high frequency module of the invention, at least part of each of the terminals may be located on the bottom surface of the layered substrate. In this case, the high frequency module may further comprise a conductor layer for the ground that is connected to the ground and located in a region surrounded by the terminals on the bottom surface of the layered substrate. An area of the conductor layer for the ground that occupies the bottom surface of the layered substrate may be greater than an area of each of the terminals that occupies the bottom surface of the layered substrate.

The high frequency module of the invention may further comprise a plurality of terminals for the ground that are connected to the ground and placed at locations that intersect the imaginary plane on the surface of the layered substrate.

The high frequency module of the invention may further comprise a conductor portion that is connected to the ground and located in a region including the imaginary plane inside the layered substrate and that electromagnetically separates the first diplexer and the second diplexer from each other. In this case, the conductor portion may be formed by using a plurality of through holes that are formed in a plurality of the dielectric layers inside the layered substrate and are connected to the ground.

In the high frequency module of the invention, the switch circuit may be mounted on the layered substrate.

In the high frequency module of the invention, the layered substrate may include a third region and a fourth region that are divided from each other by a second imaginary plane. The second imaginary plane is a plane that passes through the center of the bottom surface of the layered substrate, intersects the bottom surface of the layered substrate at a right angle, and intersects the imaginary plane separating the first and second regions from each other. In this case, the first and second antenna terminals are located in the third region while the first and second reception signal terminals and the first and second transmission signal terminals are located in the fourth region.

In the high frequency module of the invention, the conductor layers of the layered substrate include conductor layers that form the first diplexer and conductor layers that form the second diplexer, and a pattern of the conductor layers that form the first diplexer and a pattern of the conductor layers that form the second diplexer may be symmetric with respect to the imaginary plane.

In the high frequency module of the invention, the layered substrate includes the first and second regions that are divided from each other by the imaginary plane that passes through the center of the bottom surface of the layered substrate and that intersects the bottom surface at a right angle. The first diplexer, the first antenna terminal, the first reception signal terminal and the second reception signal terminal are located in the first region. The second diplexer, the second antenna terminal, the first transmission signal terminal and the second transmission signal terminal are located in the second region. Locations of the first and second antenna terminals, locations of the first reception signal terminal and the first transmission signal terminal, and locations of the second reception signal terminal and the second transmission signal terminal are symmetric, respectively, with respect to the imaginary plane. According to the invention, the foregoing configuration makes it possible to improve the isolation between the first and second diplexers. Furthermore, according to the invention, it is possible to reduce the length of the transmission line connecting the circuitry located inside the layered substrate to the terminals located on the surface of the layered substrate. It is thereby possible to reduce the loss and noise that occur in the high frequency module. These features of the invention make it possible to implement a high frequency module that is capable of processing transmission signals and reception signals in a plurality of frequency bands and that achieves a reduction in size and an improvement in characteristic.

The high frequency module of the invention may further comprise a plurality of non-input/output terminals that are not used for inputting and outputting signals and that are respectively located between adjacent ones of the terminals on the surface of the layered substrate. In this case, it is possible to prevent electromagnetic interference between adjacent ones of the terminals.

The high frequency module of the invention may further comprise the conductor layer for the ground that is connected to the ground and located in the region surrounded by the terminals on the bottom surface of the layered substrate. In this case, it is possible to enhance the strength of the bottom surface of the layered substrate on which the terminals are placed and to improve the strength of joint between the high frequency module and a mounting board when the high frequency module is mounted on the mounting board.

The high frequency module of the invention may further comprise the conductor portion that is connected to the ground and located in a region including the imaginary plane inside the layered substrate and that electromagnetically separates the first diplexer and the second diplexer from each other. In this case, it is possible to improve the isolation between the first and second diplexers.

In the high frequency module of the invention, the conductor portion may be formed by using a plurality of through holes that are formed in a plurality of the dielectric layers inside the layered substrate and are connected to the ground. In this case, it is possible to reduce the stray capacitance resulting from the conductor portion and to further reduce the high frequency module in dimension.

In the high frequency module of the invention, the layered substrate may include the third region and the fourth region that are divided from each other by the second imaginary plane, and the first and second antenna terminals may be located in the third region while the first and second reception signal terminals and the first and second transmission signal terminals may be located in the fourth region. In this case, a reduction is achieved in unwanted portions of the transmission line between the first and second antenna terminals and each of the first and second reception signal terminals and the first and second transmission signal terminals. It is thereby possible to reduce the loss and noise that occur in the high frequency module.

In the high frequency module of the invention, the pattern of the conductor layers that form the first diplexer and the pattern of the conductor layers that form the second diplexer may be symmetric with respect to the imaginary plane. In this case, it is easy to design the patterns of the conductor layers and it is thereby possible to reduce the time required for designing.

Other and further objects, features and advantages of the invention will appear more fully from the following description.

DESCRIPTION OF PREFERRED EMBODIMENTS

First Embodiment

Preferred embodiments of the invention will now be described with reference to the accompanying drawings. A high frequency module of a first embodiment of the invention will be first described. The high frequency module of the embodiment is used in a communications apparatus for a wireless LAN and designed to process reception signals and transmission signals in a first frequency band and reception signals and transmission signals in a second frequency band that is higher than the first frequency band. The first frequency band is a 2.4 GHz band that is used for the IEEE802.11b and the IEEE802.11g, for example. The second frequency band is a 5 GHz band that is used for the IEEE802.11a, for example. The high frequency module of the embodiment is provided for a diversity.

Figure 3:
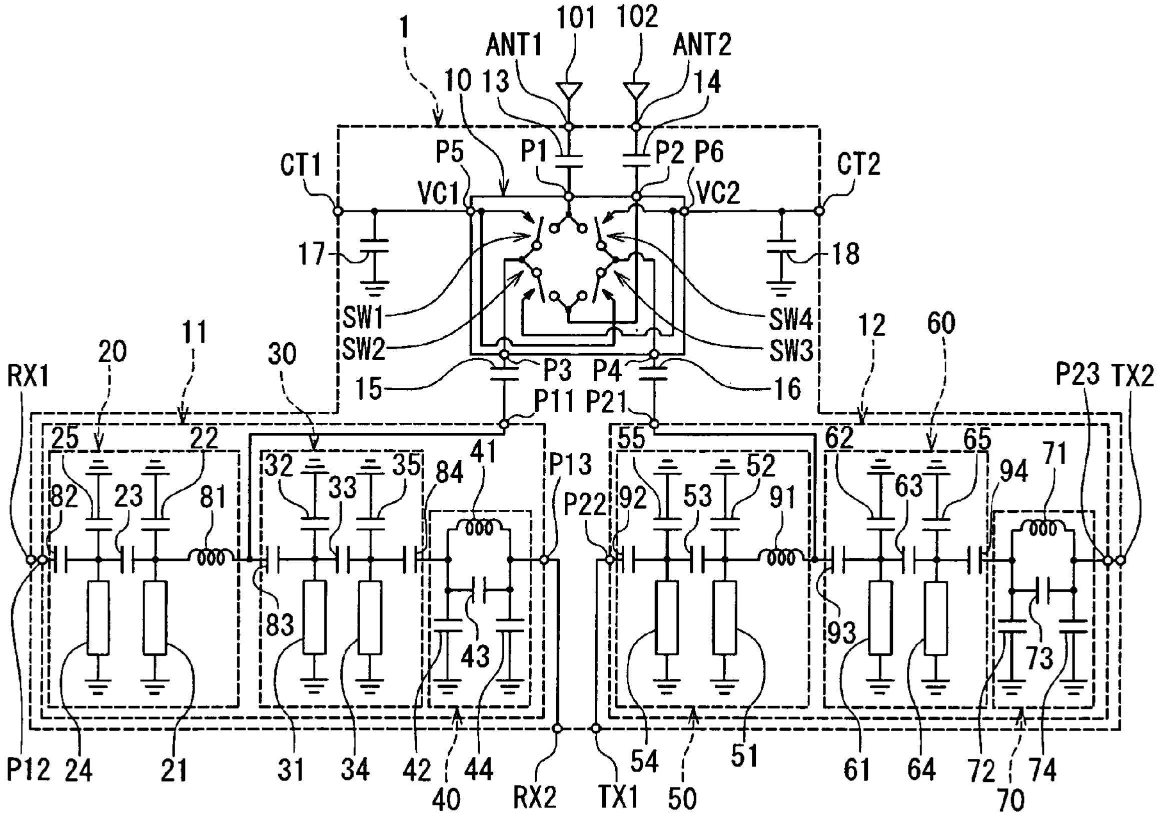
FIG. 3 is a schematic diagram illustrating the high frequency module of the first embodiment of the invention.

FIG. 3 is a schematic diagram illustrating the high frequency module of the embodiment. The high frequency module 1 of the embodiment comprises: first and second antenna terminals ANT1 and ANT2 connected to different antennas 101 and 102, respectively; a first reception signal terminal RX1 for outputting a reception signal in the first frequency band (the reception signal is hereinafter called a first reception signal); a second reception signal terminal RX2 for outputting a reception signal in the second frequency band (the reception signal is hereinafter called a second reception signal); a first transmission signal terminal TX1 for receiving a transmission signal in the first frequency band (the transmission signal is hereinafter called a first transmission signal); a second transmission signal terminal TX2 for receiving a transmission signal in the second frequency band (the transmission signal is hereinafter called a second transmission signal); a first control terminal CT1 for receiving a first control signal VC1; and a second control terminal CT2 for receiving a second control signal VC2. The reception signal terminals RX1 and RX2, the transmission signal terminals TX1 and TX2, and the control terminals CT1 and CT2 are connected to an external circuit.

The high frequency module 1 further comprises: a switch circuit 10 connected to the antenna terminals ANT1 and ANT2; a first diplexer 11 connected to the reception signal terminals RX1 and RX2 and the switch circuit 10; and a second diplexer 12 connected to the transmission signal terminals TX1 and TX2 and the switch circuit 10.

The high frequency module 1 further comprises capacitors 13 to 18. The capacitor 13 is inserted in series to a signal path between the switch circuit 10 and the antenna terminal ANT1. The capacitor 14 is inserted in series to a signal path between the switch circuit 10 and the antenna terminal ANT2. The capacitor 15 is inserted in series to a signal path between the switch circuit 10 and the diplexer 11. The capacitor 16 is inserted in series to a signal path between the switch circuit 10 and the diplexer 12. Each of the capacitors 13, 14, 15 and 16 is provided for blocking passing of a direct current resulting from the control signals VC1 and VC2. The capacitor 17 has an end connected to the control terminal CT1 and the other end grounded. The capacitor 18 has an end connected to the control terminal CT2 and the other end grounded.

The switch circuit 10 incorporates six ports P1 to P6. The port P1 is connected to the antenna terminal ANT1 through the capacitor 13. The port P2 is connected to the antenna terminal ANT2 through the capacitor 14. The port P3 is connected to the diplexer 11 through the capacitor 15. The port P4 is connected to the diplexer 12 through the capacitor 16. The ports P5 and P6 are connected to the control terminals CT1 and CT2, respectively.

The switch circuit 10 further incorporates four switches SW1 to SW4 for each of which a conducting state or a nonconducting state is chosen. Each of the switches SW1 to SW4 is formed using a field-effect transistor made of a GaAs compound semiconductor, for example. The switch SW1 has an end connected to the port P1 and the other end connected to the port P3. The switch SW2 has an end connected to the port P2 and the other end connected to the port P3. The switch SW3 has an end connected to the port P2 and the other end connected to the port P4. The switch SW4 has an end connected to the port P1 and the other end connected to the port P4.

The switches SW1 and SW3 are conducting when the control signal VC1 inputted to the port P5 is high. The switches. SW1 and SW3 are nonconducting when the control signal VC1 is low. The switches SW2 and SW4 are conducting when the control signal VC2 inputted to the port P6 is high. The switches SW2 and SW4 are nonconducting when the control signal VC2 is low. Consequently, when the control signal VC1 is high and the control signal VC2 is low, the ports P1 and P3 are connected to each other while the ports P2 and P4 are connected to each other. At this time, the diplexer 11 is connected to the antenna terminal ANT1 while the diplexer 12 is connected to the antenna terminal ANT2. On the other hand, when the control signal VC1 is low and the control signal VC2 is high, the ports P1 and P4 are connected to each other while the ports P2 and P3 are connected to each other. At this time, the diplexer 11 is connected to the antenna terminal ANT2 while the diplexer 12 is connected to the antenna terminal ANT1. In such a manner, the switch circuit 10 connects one of the diplexers 11 and 12 to one of the antenna terminals ANT1 and ANT2.

The diplexer 11 has three ports P11 to P13. The port P11 is connected to the port P3 of the switch circuit 10 through the capacitor 15. The port P12 is connected to the reception signal terminal RX1. The port P13 is connected to the reception signal terminal RX2.

The diplexer 11 further incorporates: two bands-pass filters (which may be hereinafter referred to as BPFs) 20 and 30; a low-pass filter (which may be hereinafter referred to as an LPF) 40. The BPF 20 has an end connected to the port P11 and the other end connected to the port P12. The BPF 30 has an end connected to the port P11 and the other end connected to an end of the LPF 40. The other end of the LPF 40 is connected to the port P13.

The BPF 20 incorporates: an inductor 81; transmission lines 21 and 24 having an inductance; and capacitors 22, 23, 25 and 82. Each of the transmission line 21 and the capacitors 22 and 23 has an end connected to the port P11 through the inductor 81. Each of the transmission line 21 and the capacitor 22 has the other end grounded. Each of the transmission line 24 and the capacitor 25 has an end connected to the other end of the capacitor 23 and connected to the port P12 through the capacitor 82. Each of the transmission line 24 and the capacitor 25 has the other end grounded. The transmission line 21 and the capacitor 22 make up a parallel resonant circuit. The transmission line 24 and the capacitor 25 make up another parallel resonant circuit. The BPF 20 is thus formed using the two parallel resonant circuits.

The BPF 30 incorporates: transmission lines 31 and 34 having an inductance; and capacitors 32, 33, 35, 83 and 84. Each of the transmission line 31 and the capacitors 32 and 33 has an end connected to the port P11 through the capacitor 83. Each of the transmission line 31 and the capacitor 32 has the other end grounded. Each of the transmission line 34 and the capacitor 35 has an end connected to the other end of the capacitor 33 and connected to the LPF 40 through the capacitor 84. Each of the transmission line 34 and the capacitor 35 has the other end grounded. The transmission line 31 and the capacitor 32 make up a parallel resonant circuit. The transmission line 34 and the capacitor 35 make up another parallel resonant circuit. The BPF 30 is thus formed using the two parallel resonant circuits.

The LPF 40 incorporates an inductor 41 and capacitors 42, 43 and 44. Each of the inductor 41 and the capacitors 42 and 43 has an end connected to the BPF 30. Each of the inductor 41 and the capacitor 43 has the other end connected to the port P13. The capacitor 42 has the other end grounded. The capacitor 44 has an end connected to the port P13 and the other end grounded.

The BPF 20 allows signals of frequencies within the first frequency band to pass and intercepts signals of frequencies outside the first frequency band. As a result, the BPF 20 allows passage of the first reception signal that has been inputted to the antenna terminal ANT1 or ANT2 and passed through the switch circuit 10, and sends it to the reception signal terminal RX1. The inductor 81 and the capacitor 82 improve a passing characteristic of the path of the first reception signal including the BPF 20.

The BPF 30 allows signals of frequencies within the second frequency band to pass and intercepts signals of frequencies outside the second frequency band. The LPF 40 allows signals of frequencies within the second frequency band and signals of frequencies lower than the second frequency band to pass, and intercepts signals of frequencies higher than the second frequency band. As a result, the BPF 30 and the LPF 40 allow passage of the second reception signal that has been inputted to the antenna terminal ANT1 or ANT2 and passed through the switch circuit 10, and send it to the reception signal terminal RX2. The capacitors 83 and 84 improve a passing characteristic of the path of the second reception signal including the BPF 30 and the LPF 40.

The diplexer 12 has three ports P21 to P23. The port P21 is connected to the port P4 of the switch circuit 10 through the capacitor 16. The port P22 is connected to the transmission signal terminal TX1. The port P23 is connected to the transmission signal terminal TX2.

The diplexer 12 further incorporates two BPFs 50 and 60 and an LPF 70. The BPF 50 has an end connected to the port P21 and the other end connected to the port P22. The BPF 60 has an end connected to the port P21 and the other end connected to an end of the LPF 70. The other end of the LPF 70 is connected to the port P23.

The BPF 50 incorporates an inductor 91, transmission lines 51 and 54 having an inductance, and capacitors 52, 53, 55 and 92. Each of the transmission line 51 and the capacitors 52 and 53 has an end connected to the port P21 through the inductor 91. Each of the transmission line 51 and the capacitor 52 has the other end grounded. Each of the transmission line 54 and the capacitor 55 has an end connected to the other end of the capacitor 53 and connected to the port P22 through the capacitor 92. Each of the transmission line 54 and the capacitor 55 has the other end grounded. The transmission line 51 and the capacitor 52 make up a parallel resonant circuit. The transmission line 54 and the capacitor 55 make up another parallel resonant circuit. The BPF 50 is thus formed using the two parallel resonant circuits.

The BPF 60 incorporates: transmission lines 61 and 64 having an inductance; and capacitors 62, 63, 65, 93 and 94. Each of the transmission line 61 and the capacitors 62 and 63 has an end connected to the port P21 through the capacitor 93. Each of the transmission line 61 and the capacitor 62 has the other end grounded. Each of the transmission line 64 and the capacitor 65 has an end connected to the other end of the capacitor 63 and connected to the LPF 70 through the capacitor 94. Each of the transmission line 64 and the capacitor 65 has the other end grounded. The transmission line 61 and the capacitor 62 make up a parallel resonant circuit. The transmission line 64 and the capacitor 65 make up another parallel resonant circuit. The BPF 60 is thus formed using the two parallel resonant circuits.

The LPF 70 incorporates an inductor 71, and capacitors 72, 73 and 74. Each of the inductor 71 and the capacitors 72 and 73 has an end connected to the BPF 60. Each of the inductor 71 and the capacitor 73 has the other end connected to the port P23. The capacitor 72 has the other end grounded. The capacitor 74 has an end connected to the port P23 and the other end grounded.

The BPF 50 allows signals of frequencies within the first frequency band to pass and intercepts signals of frequencies outside the first frequency band. As a result, the BPF 50 allows the first transmission signal inputted to the transmission signal terminal TX1 to pass and sends it to the switch circuit 10. The inductor 91 and the capacitor 92 improve a passing characteristic of the path of the first transmission signal including the BPF 50.

The BPF 60 allows signals of frequencies within the second frequency band to pass and intercepts signals of frequencies outside the second frequency band. The LPF 70 allows signals of frequencies within the second frequency band and signals of frequencies lower than the second frequency band to pass, and intercepts signals of frequencies higher than the second frequency band. As a result, the BPF 60 and the LPF 70 allow the second transmission signal inputted to the transmission signal terminal TX2 to pass and sends it to the switch circuit 10. The capacitors 93 and 94 improve a passing characteristic of the path of the second transmission signal including the BPF 60 and the LPF 70.

In the high frequency module 1, the first reception signal inputted to the antenna terminal ANT1 or ANT2 passes through the switch circuit 10 and the BPF 20 and is sent to the reception signal terminal RX1. The second reception signal inputted to the antenna terminal ANT1 or ANT2 passes through the switch circuit 10, the BPF 30 and the LPF 40, and is sent to the reception signal terminal RX2. The first transmission signal inputted to the transmission signal terminal TX1 passes through the BPF 50 and the switch circuit 10 and is sent to the antenna terminal ANT1 or ANT2. The second transmission signal inputted to the transmission signal terminal TX2 passes through the LPF 70, the BPF 60 and the switch circuit 10 and is sent to the antenna terminal ANT1 or ANT2.

Figure 1:
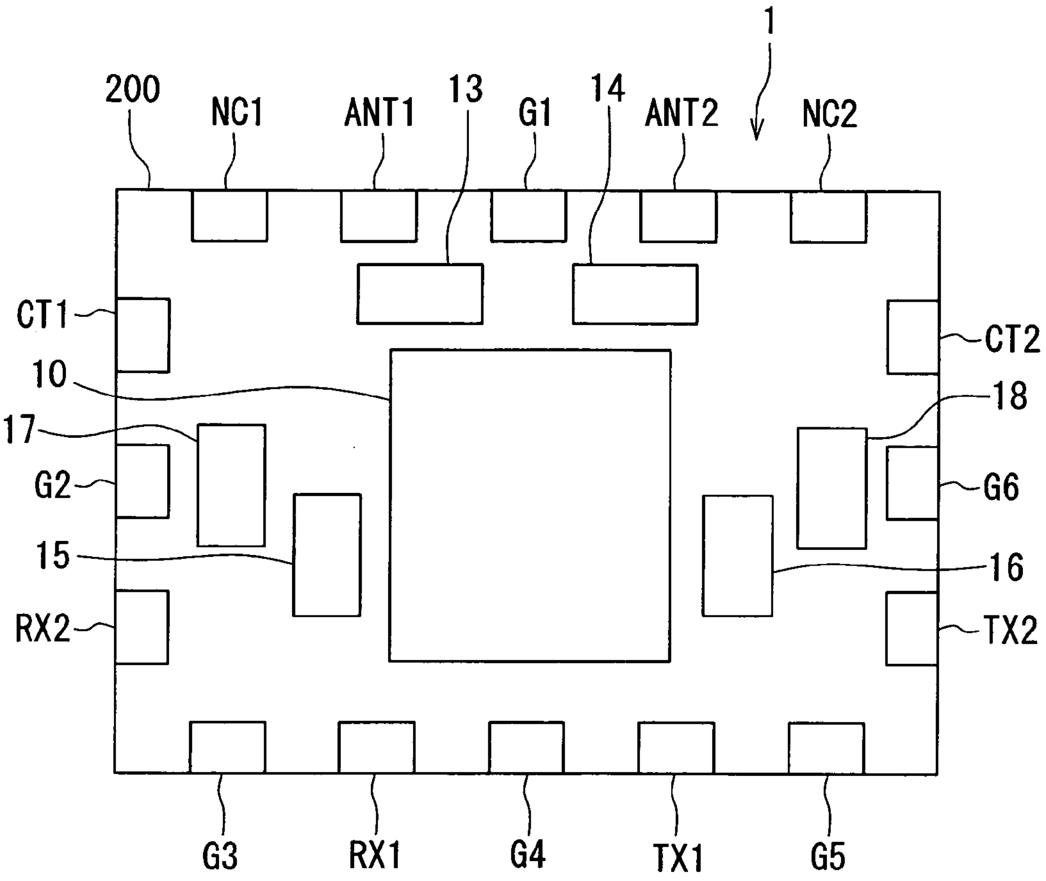
FIG. 1 is a top view of a high frequency module of a first embodiment of the invention.
Figure 2:
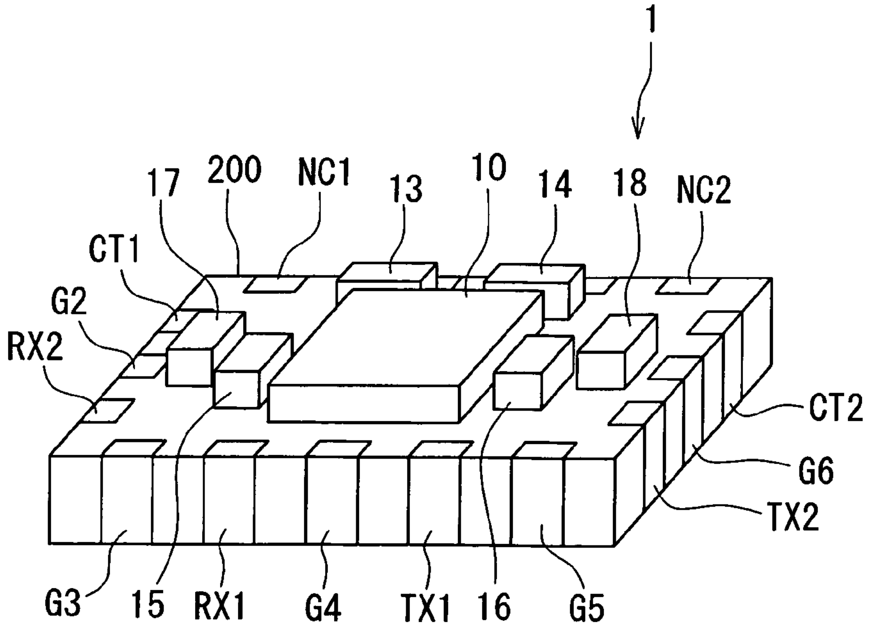
FIG. 2 is a perspective view of the appearance of the high frequency module of the first embodiment of the invention.

Reference is now made to FIG. 1 and FIG. 2 to describe the structure of the high frequency module 1. FIG. 1 is a top view of the high frequency module 1. FIG. 2 is a perspective view illustrating an appearance of the high frequency module 1. As shown in FIG. 1 and FIG. 2, the high frequency module 1 comprises a layered substrate 200 for integrating the components of the high frequency module 1 previously mentioned. The layered substrate 200 includes dielectric layers and conductor layers that are alternately stacked. The circuits of the high frequency module 1 are formed using the conductor layers located inside the layered substrate 200 or on a surface of the layered substrate 200, and elements mounted on the top surface of the layered substrate 200. Here is an example in which the switch circuit 10 and the capacitors 13 to 18 of FIG. 3 are mounted on the layered substrate 200. The switch circuit 10 has the form of a single component. The layered substrate 200 is a multilayer substrate of low-temperature co-fired ceramic, for example.

The terminals ANT1, ANT2, RX1, RX2, TX1, TX2, CT1 and CT2 previously mentioned, six ground terminals G1 to G6, and terminals NC1 and NC2 are provided to extend from the top surface to the bottom surface through the side surfaces of the layered substrate 200. The ground terminals G1 to G6 are connected to the ground. The terminals NC1 and NC2 are connected neither to the conductor layers inside the layered substrate 200 nor to external circuits. As shown in FIG. 1, the plane geometry of the layered substrate 200 is a rectangle. Of this rectangle two longer sides are called a first side (the upper side of FIG. 1) and a second side (the lower side of FIG. 1), and two shorter sides are called a third side (the left-hand side of FIG. 1) and a fourth side (the right-hand side of FIG. 1).

On the first side the terminal G1 is placed in the middle and the terminals ANT 1 and ANT 2 are placed on both sides of the terminal G1. On the first side the terminal NC1 is placed on a side of the terminal ANT1 opposite to the terminal G1, and the terminal NC2 is placed on a side of the terminal ANT2 opposite to the terminal G1. On the second side the terminal G4 is placed in the middle and the terminals RX1 and TX1 are placed on both sides of the terminal G4. On the second side the terminal G3 is placed on a side of the terminal RX1 opposite to the terminal G4, and the terminal G5 is placed on a side of the TX1 opposite to the terminal G4. On the third side the terminal G2 is placed in the middle, the terminal CT1 is placed between the terminal G2 and the first side, and the terminal RX2 is placed between the terminal G2 and the second side. On the fourth side the terminal G6 is placed in the middle, the terminal CT2 is placed between the terminal G6 and the first side, and the terminal TX2 is placed between the terminal G6 and the second side.

The diplexers 11 and 12 are provided inside the layered substrate 200. The diplexer 11 is a circuit that performs processing of separating the first reception signal and the second reception signal from each other. The diplexer 12 is a circuit that performs processing of separating the first transmission signal and the second transmission signal from each other.

Figure 4:
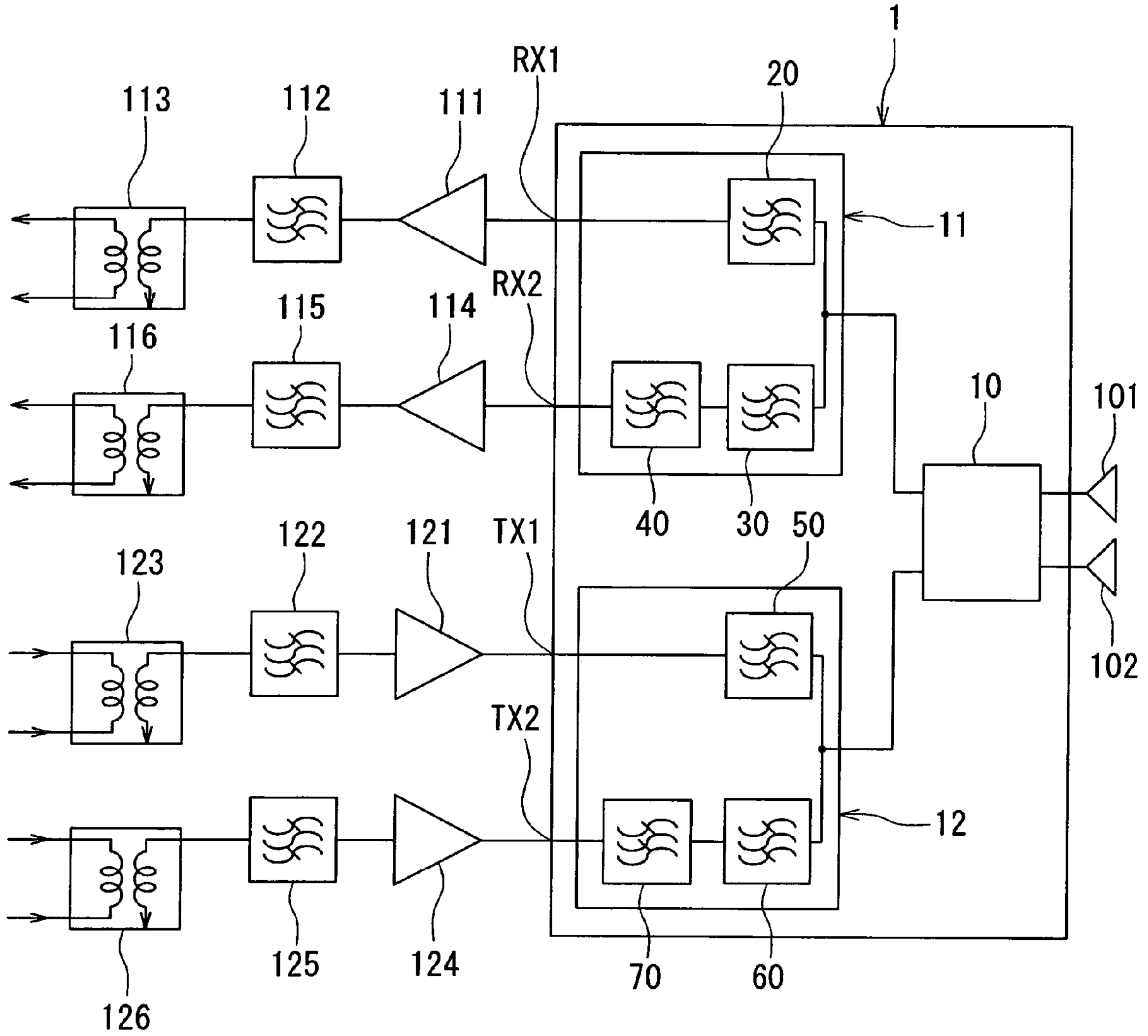
FIG. 4 is a block diagram illustrating an example of the configuration of a high frequency circuit section of a communications apparatus for a wireless LAN in which the high frequency module of the first embodiment of the invention is used.

Reference is now made to FIG. 4 to describe an example of configuration of a high frequency circuit section of a communications apparatus for a wireless LAN in which the high frequency module 1 of the embodiment is used. The high frequency circuit section of FIG. 4 comprises the high frequency module 1, and the two antennas 101 and 102 connected to the high frequency module 1.

The high frequency circuit section further comprises: a low-noise amplifier 111 having an input connected to the reception signal terminal RX1 of the high frequency module 1; a BPF 112 having an end connected to an output of the low-noise amplifier 111; and a balun 113 having an unbalanced terminal connected to the other end of the BPF 112. The first reception signal outputted from the reception signal terminal RX1 is amplified at the low-noise amplifier 111, then passes through the BPF 112, is converted to a balanced signal at the balun 113, and is outputted from two balanced terminals of the balun 113.

The high frequency circuit section further comprises: a low-noise amplifier 114 having an input connected to the reception signal terminal RX2 of the high frequency module 1; a BPF 115 having an end connected to an output of the low-noise amplifier 114; and a balun 116 having an unbalanced terminal connected to the other end of the BPF 115. The second reception signal outputted from the reception signal terminal RX2 is amplified at the low-noise amplifier 114, then passes through the BPF 115, is converted to a balanced signal at the balun 116, and is outputted from two balanced terminals of the balun 116.

The high frequency circuit section further comprises: a power amplifier 121 having an output connected to the transmission signal terminal TX1 of the high frequency module 1; a BPF 122 having an end connected to an input of the power amplifier 121; and a balun 123 having an unbalanced terminal connected to the other end of the BPF 122. A balanced signal corresponding to the first transmission signal is inputted to two balanced terminals of the balun 123, is converted to an unbalanced signal at the balun 123, passes through the BPF 122, is amplified at the power amplifier 121, and then given to the transmission signal terminal TX1 as the first transmission signal.

The high frequency circuit section further comprises: a power amplifier 124 having an output connected to the transmission signal terminal TX2 of the high frequency module 1; a BPF 125 having an end connected to an input of the power amplifier 124; and a balun 126 having an unbalanced terminal connected to the other end of the BPF 125. A balanced signal corresponding to the second transmission signal is inputted to two balanced terminals of the balun 126, is converted to an unbalanced signal at the balun 126, passes through the BPF 125, is amplified at the power amplifier 124, and then given to the transmission signal terminal TX2 as the second transmission signal.

The configuration of the high frequency circuit section is not limited to the one illustrated in FIG. 4 but a variety of modifications are possible. For example, the high frequency circuit section may be one that does not incorporate the baluns 113 and 116 and that allows a signal having passed through the BPFs 112 and 115 to be outputted as an unbalanced signal as it is. The positional relationship between the low-noise amplifier 111 and the BPF 112 and the positional relationship between the low-noise amplifier 114 and the BPF 115 may be the reverse of the ones shown in FIG. 4. Furthermore, low-pass filters or high-pass filters may be provided in place of the BPFs 112, 115, 122 and 125.

Reference is now made to FIG. 5 to FIG. 25 to describe an example of configuration of the layered substrate 200. FIG. 5 to FIG. 24 illustrate top surfaces of first to twentieth (the lowest) dielectric layers from the top. FIG. 25 illustrates the twentieth dielectric layer from the top and a conductor layer therebelow. Small circles of FIG. 5 to FIG. 24 indicate through holes.

Figure 5:
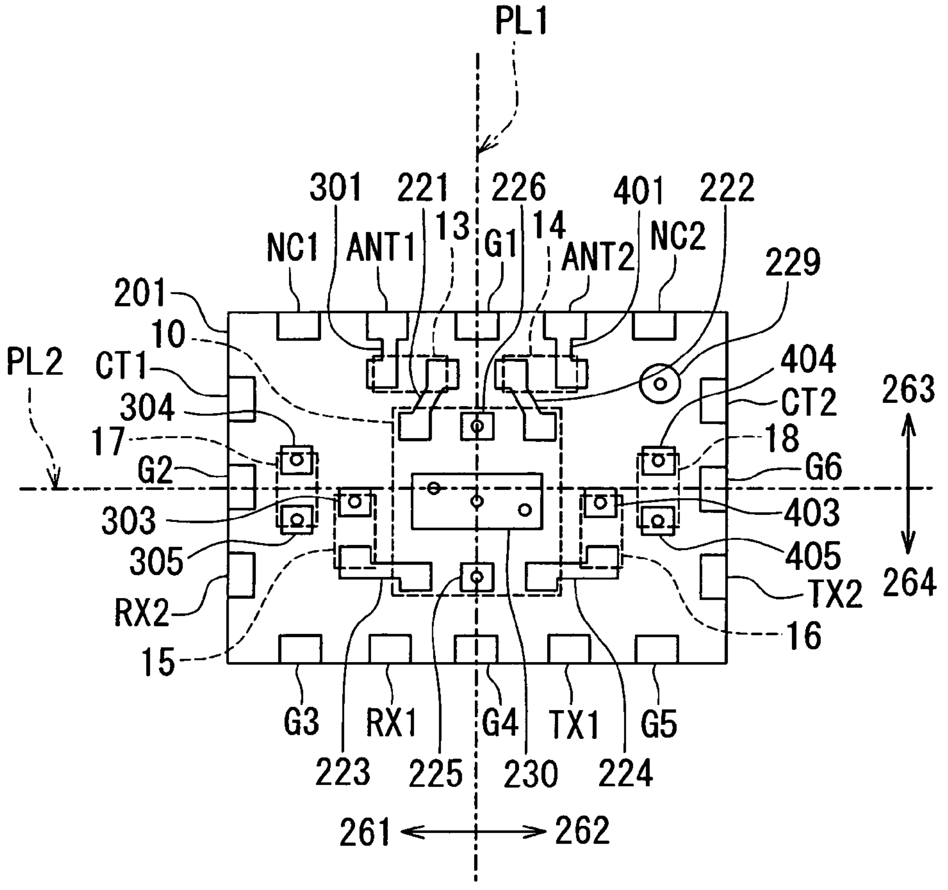
FIG. 5 is a top view illustrating a top surface of a first dielectric layer of the layered substrate of FIG. 1.

On the top surface of the first dielectric layer 201 of FIG. 5, a conductor layer 301 connected to the terminal ANT1, a conductor layer 401 connected to the terminal ANT2, and conductor layers which make up the terminals RX1, RX2, TX1, TX2, CT1, CT2, G1 to G6, NC1, and NC2 are formed. Furthermore, on the top surface of the dielectric layer 201, six conductor layers 221 to 226 to which the ports P1 to P6 of the switch circuit 10 are connected and a conductor layer 230 connected to the ground are formed. On the top surface of the dielectric layer 201, conductor layers 229, 303, 304, 305, 403, 404 and 405 are formed. The conductor layer 229 is used for alignment of the high frequency module 1.

The capacitor 13 has an end connected to the conductor layer 221 and the other end connected to the conductor layer 301. The capacitor 14 has an end connected to the conductor layer 222 and the other end connected to the conductor layer 401. The capacitor 15 has an end connected to the conductor layer 223 and the other end connected to the conductor layer 303. The capacitor 16 has an end connected to the conductor layer 224 and the other end connected to the conductor layer 403. The capacitor 17 has an end connected to the conductor layer 304 and the other end connected to the conductor layer 305. The capacitor 18 has an end connected to the conductor layer 404 and the other end connected to the conductor layer 405.

Figure 6:
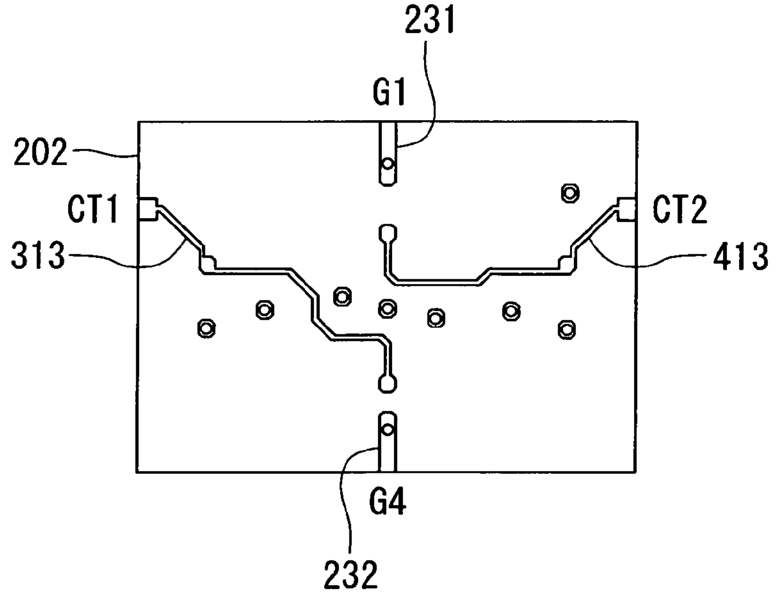
FIG. 6 is a top view illustrating a top surface of a second dielectric layer of the layered substrate of FIG. 1.

On the top surface of the second dielectric layer 202 of FIG. 6, conductor layers 231, 232, 313 and 413 are formed. The conductor layer 231 is connected to the terminal G1. The conductor layer 232 is connected to the terminal G4. The conductor layer 313 is connected to the terminal CT1. The conductor layer 413 is connected to the terminal CT2. The conductor layers 225 and 304 of FIG. 5 are connected to the conductor layer 313 via through holes formed in the dielectric layer 201. The conductor layers 226 and 404 of FIG. 5 are connected to the conductor layer 413 via through holes formed in the dielectric layer 201.

Figure 7:
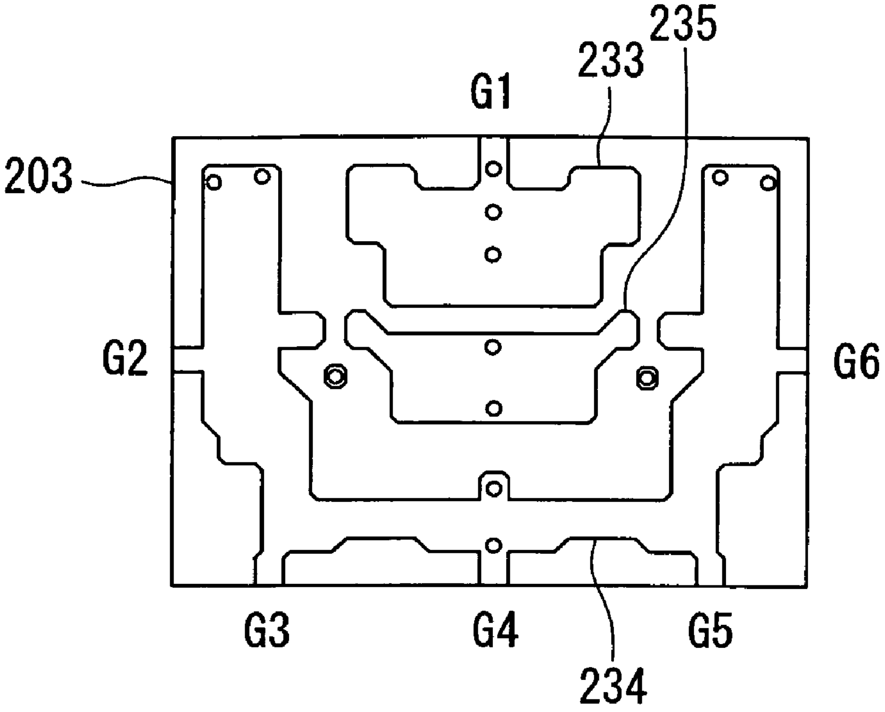
FIG. 7 is a top view illustrating a top surface of a third dielectric layer of the layered substrate of FIG. 1.

On the top surface of the third dielectric layer 203 of FIG. 7, conductor layers 233 to 235 for the ground are formed. The conductor layer 233 is connected to the terminal G1. The conductor layer 231 of FIG. 6 is connected to the conductor layer 233 via a through hole formed in the dielectric layer 202. The conductor layer 234 is connected to the terminals G2 to G6. The conductor layer 232 of FIG. 6 is connected to the conductor layer 234 via a through hole formed in the dielectric layer 202. The conductor layers 229, 305 and 405 of FIG. 5 are connected to the conductor layer 234 via through holes formed in the dielectric layers 201 and 202. The conductor layer 230 of FIG. 5 is connected to the conductor layer 235 via through holes formed in the dielectric layers 201 and 202.

Figure 8:
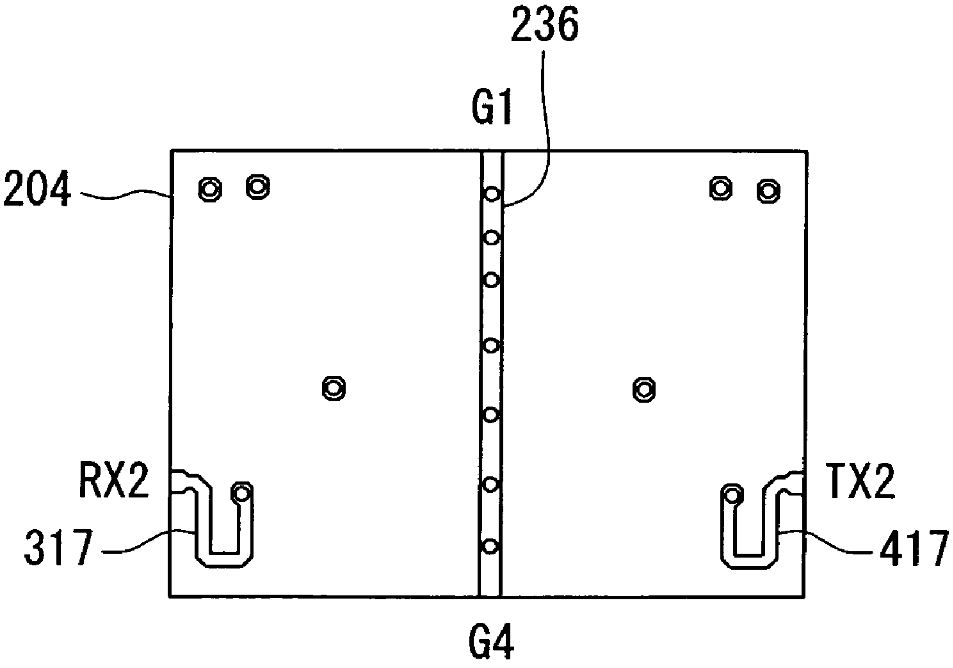
FIG. 8 is a top view illustrating a top surface of a fourth dielectric layer of the layered substrate of FIG. 1.

On the top surface of the fourth dielectric layer 204 of FIG. 8, a conductor layer 236 for the ground and conductor layers 317 and 417 for inductors are formed. The conductor layer 236 is connected to the terminals G1 and G4. The conductor layers 233 to 235 of FIG. 7 are connected to the conductor layer 236 via a plurality of through holes formed in the dielectric layer 203. The conductor layer 317 has an end connected to the terminal RX2. The conductor layer 317 makes up the inductor 41 of FIG. 3. The conductor layer 417 has an end connected to the terminal TX2. The conductor layer 417 makes up the inductor 71 of FIG. 3.

Figure 9:
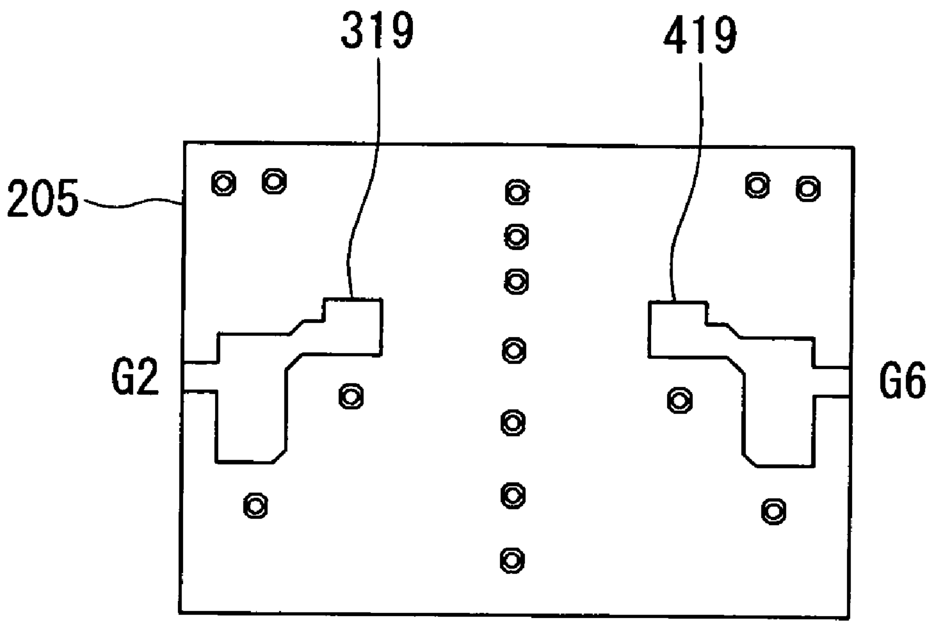
FIG. 9 is a top view illustrating a top surface of a fifth dielectric layer of the layered substrate of FIG. 1.

On the top surface of the fifth dielectric layer 205 of FIG. 9, conductor layers 319 and 419 for capacitors are formed. The conductor layer 319 is connected to the terminal G2. The conductor layer 319 makes up a portion of each of the capacitors 32, 35 and 42 of FIG. 3. The conductor layer 419 is connected to the terminal G6. The conductor layer 419 makes up a portion of each of the capacitors 62, 65 and 72 of FIG. 3.

Figure 10:
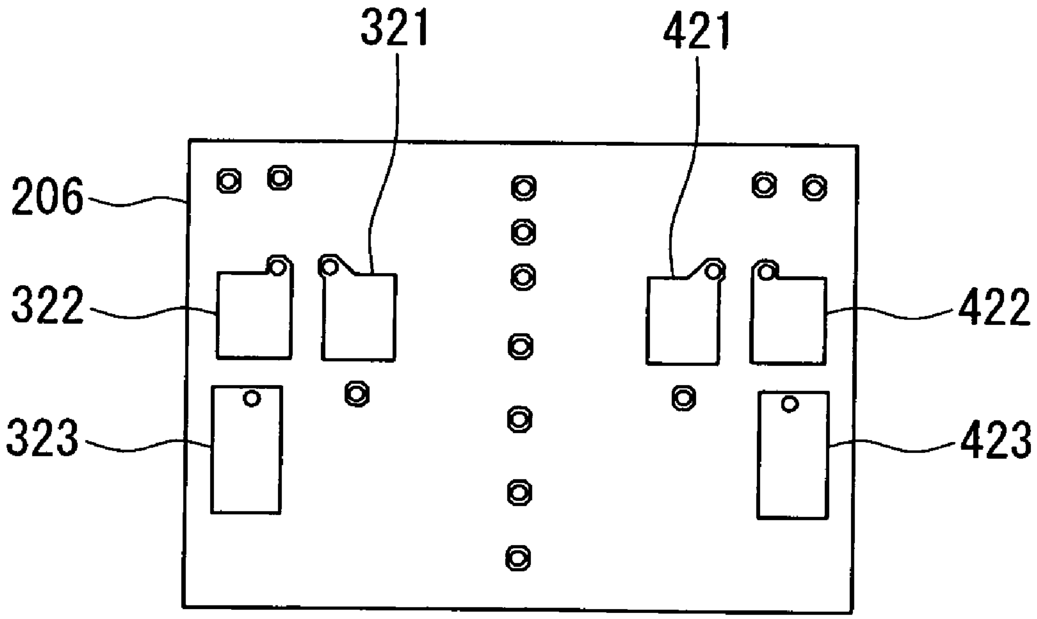
FIG. 10 is a top view illustrating a top surface of a sixth dielectric layer of the layered substrate of FIG. 1.

On the top surface of the sixth dielectric layer 206 of FIG. 10, conductor layers 321, 322, 323, 421, 422 and 423 for capacitors are formed.

The conductor layer 321 makes up the capacitor 32 of FIG. 3, together with the conductor layer 319 of FIG. 9. The conductor layer 322, together with the conductor layer 319 of FIG. 9, makes up the capacitor 35 of FIG. 3 and a portion of the capacitor 84 of FIG. 3. The conductor layer 323, together with the conductor layer 319 of FIG. 9, makes up the capacitor 42 of FIG. 3 and a portion of the capacitor 43 of FIG. 3. The conductor layer 317 of FIG. 8 is connected to the conductor layer 323 via through holes formed in the dielectric layers 204 and 205.

The conductor layer 421, together with the conductor layer 419 of FIG. 9, makes up the capacitor 62 of FIG. 3 and a portion of the capacitor 93 of FIG. 3. The conductor layer 422, together with the conductor layer 419 of FIG. 9, makes up the capacitor 65 of FIG. 3 and a portion of the capacitor 94 of FIG. 3. The conductor layer 423, together with the conductor layer 419 of FIG. 9, makes up the capacitor 72 of FIG. 3 and a portion of the capacitor 73 of FIG. 3. The conductor layer 417 of FIG. 8 is connected to the conductor layer 423 via through holes formed in the dielectric layers 204 and 205.

Figure 11:
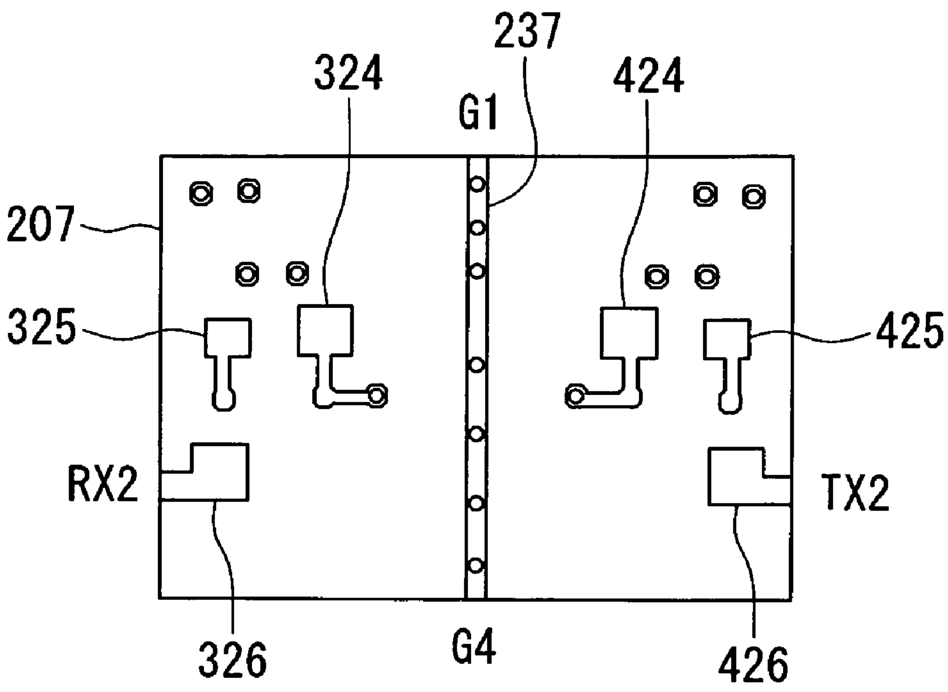
FIG. 11 is a top view illustrating a top surface of a seventh dielectric layer of the layered substrate of FIG. 1.

On the top surface of the seventh dielectric layer 207 of FIG. 11, a conductor layer 237 for the ground and conductor layers 324, 325, 326, 424, 425 and 426 for capacitors are formed. The conductor layer 237 is connected to the terminals G1 and G4. The conductor layer 236 of FIG. 8 is connected to the conductor layer 237 via through holes formed in the dielectric layers 204 to 206.

The conductor layer 303 of FIG. 5 is connected to the conductor layer 324 via through holes formed in the dielectric layers 201 to 206. The conductor layer 323 of FIG. 10 is connected to the conductor layer 325 via a through hole formed in the dielectric layer 206. The conductor layer 326 is connected to the terminal RX2. The conductor layers 324 and 325 make up portions of the capacitors 83 and 84 of FIG. 3, respectively. The conductor layer 326, together with the conductor layer 323 of FIG. 10, makes up the capacitor 43 of FIG. 3.

The conductor layer 403 of FIG. 5 is connected to the conductor layer 424 via through holes formed in the dielectric layers 201 to 206. The conductor layer 423 of FIG. 10 is connected to the conductor layer 425 via a through hole formed in the dielectric layer 206. The conductor layer 426 is connected to the terminal TX2. The conductor layers 424 and 425 make up portions of the capacitors 93 and 94 of FIG. 3, respectively. The conductor layer 426, together with the conductor layer 423 of FIG. 10, makes up the capacitor 73 of FIG. 3.

Figure 12:
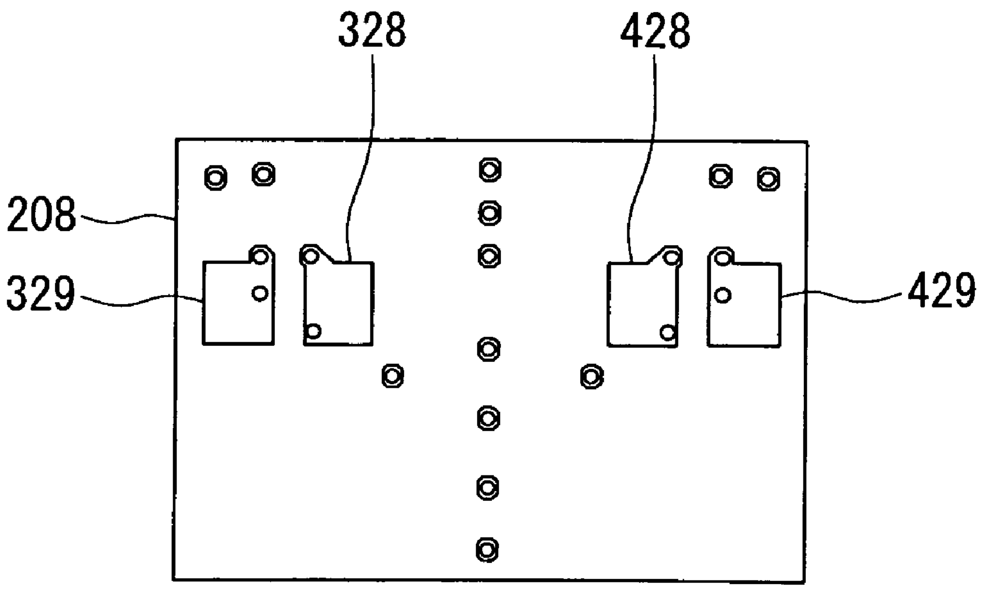
FIG. 12 is a top view illustrating a top surface of an eighth dielectric layer of the layered substrate of FIG. 1.

On the top surface of the eighth dielectric layer 208 of FIG. 12, conductor layers 328, 329, 428 and 429 for capacitors are formed.

The conductor layer 321 of FIG. 10 is connected to the conductor layer 328 via through holes formed in the dielectric layers 206 and 207. The conductor layer 322 of FIG. 10 is connected to the conductor layer 329 via through holes formed in the dielectric layers 206 and 207. The conductor layer 328, together with the conductor layer 324 of FIG. 11, makes up the capacitor 83 of FIG. 3 and a portion of the capacitor 33 of FIG. 3. The conductor layer 329, together with the conductor layer 325 of FIG. 11, makes up the capacitor 84 of FIG. 3. In addition, the conductor layer 329, together with the conductor layer 328, makes up the capacitor 33 of FIG. 3.

The conductor layer 421 of FIG. 10 is connected to the conductor layer 428 via through holes formed in the dielectric layers 206 and 207. The conductor layer 422 of FIG. 10 is connected to the conductor layer 429 via through holes formed in the dielectric layers 206 and 207. The conductor layer 428, together with the conductor layer 424 of FIG. 11, makes up the capacitor 93 of FIG. 3 and a portion of the capacitor 63 of FIG. 3. The conductor layer 429, together with the conductor layer 425 of FIG. 11, makes up the capacitor 94 of FIG. 3. In addition, the conductor layer 429, together with the conductor layer 428, makes up the capacitor 63 of FIG. 3.

Figure 13:
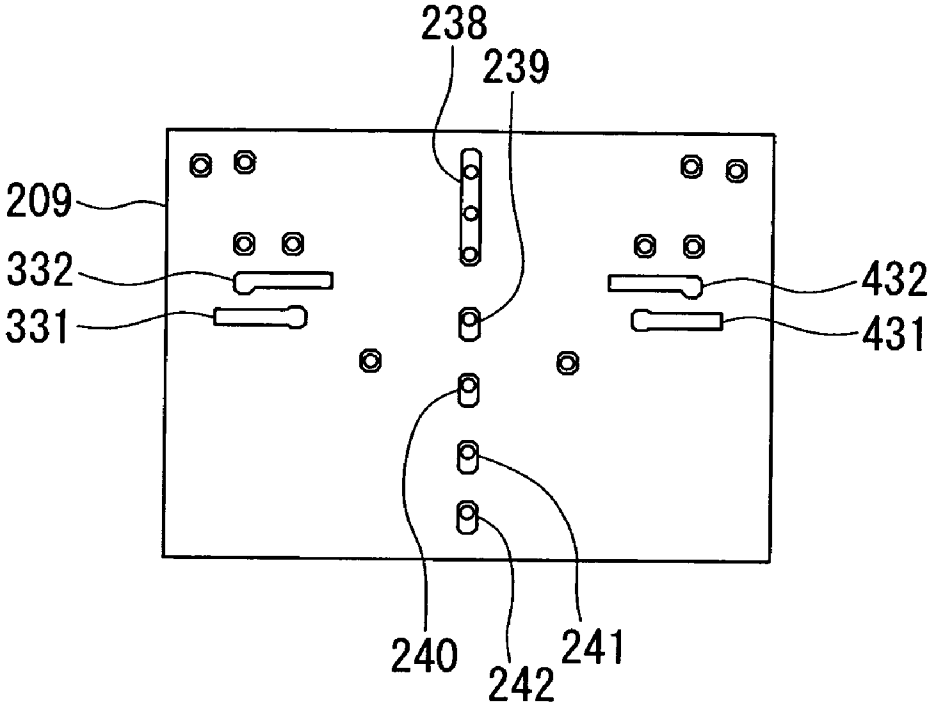
FIG. 13 is a top view illustrating a top surface of a ninth dielectric layer of the layered substrate of FIG. 1.

On the top surface of the ninth dielectric layer 209 of FIG. 13, conductor layers 238 to 242 for the ground and conductor layers 331, 332, 431 and 432 for capacitors are formed. The conductor layer 237 of FIG. 11 is connected to the conductor layers 238 to 242 via through holes formed in the dielectric layers 207 and 208.

The conductor layer 328 of FIG. 12 is connected to the conductor layer 331 via through holes formed in the dielectric layer 208. The conductor layer 329 of FIG. 12 is connected to the conductor layer 332 via through holes formed in the dielectric layer 208. The conductor layers 331 and 332 make up the capacitor 33 of FIG. 3.

The conductor layer 428 of FIG. 12 is connected to the conductor layer 431 via through holes formed in the dielectric layer 208. The conductor layer 429 of FIG. 12 is connected to the conductor layer 432 via through holes formed in the dielectric layer 208. The conductor layers 431 and 432 make up the capacitor 63 of FIG. 3.

Figure 14:
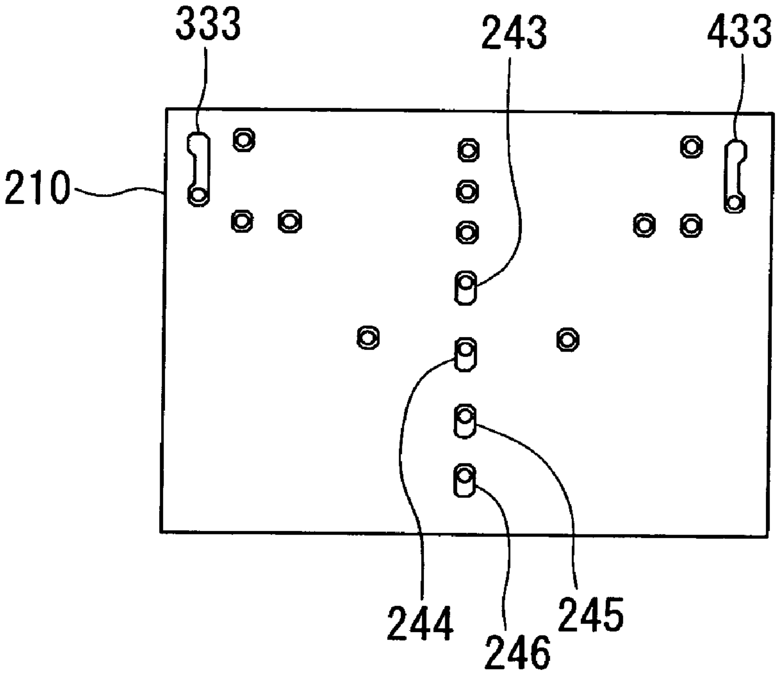
FIG. 14 is a top view illustrating a top surface of a tenth dielectric layer of the layered substrate of FIG. 1.

On the top surface of the tenth dielectric layer 210 of FIG. 14, conductor layers 243 to 246 for the ground and conductor layers 333 and 433 are formed. The conductor layers 239 to 242 of FIG. 13 are connected to the conductor layers 243 to 246 via through holes formed in the dielectric layer 209, respectively. The conductor layer 234 of FIG. 7 is connected to the conductor layers 333 and 433 via through holes formed in the dielectric layers 203 to 209.

Figure 15:
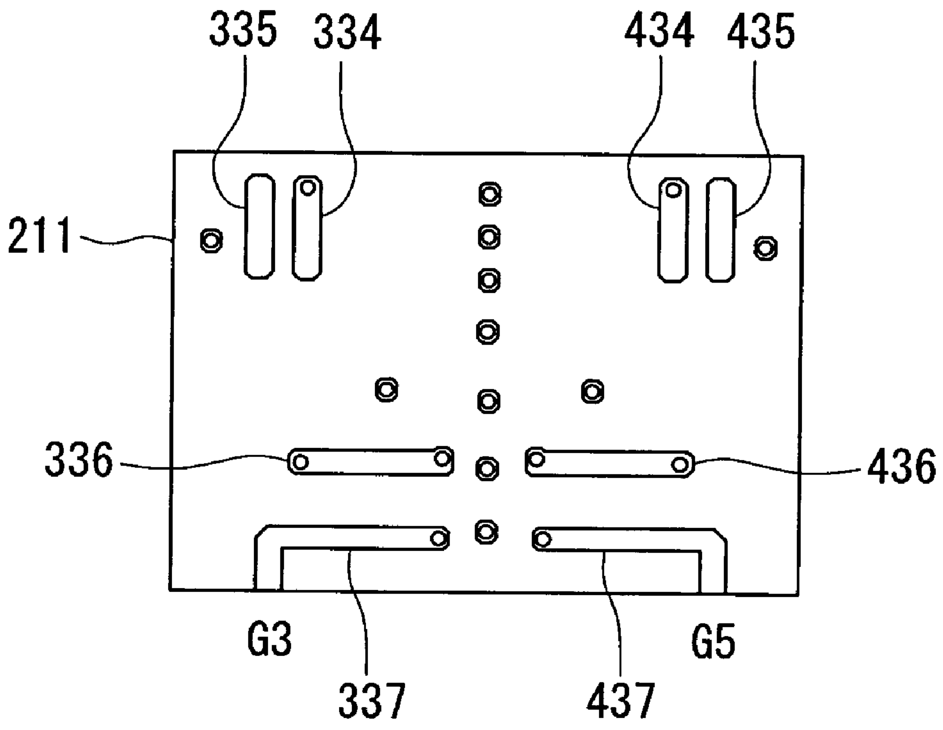
FIG. 15 is a top view illustrating a top surface of an eleventh dielectric layer of the layered substrate of FIG. 1.

On the top surface of the eleventh dielectric layer 211 of FIG. 15, conductor layers 334, 335, 336, 337, 434, 435, 436 and 437 are formed.

The conductor layer 328 of FIG. 12 is connected to the conductor layer 334 via through holes formed in the dielectric layers 208 to 210. The conductor layer 329 of FIG. 12 is connected to the conductor layer 335 via through holes formed in the dielectric layers 208 to 210. The conductor layer 234 of FIG. 7 is connected to the conductor layer 335 via through holes formed in the dielectric layers 203 to 210. The conductor layer 337 is connected to the terminal G3. The conductor layers 334, 335, 336 and 337 make up the transmission lines 31, 34, 21 and 24 of FIG. 3, respectively. The transmission lines 31, 34, 21 and 24 made up of the conductor layers 334, 335, 336 and 337 are distributed constant lines. In the embodiment the longitudinal direction of the transmission lines 21 and 24 (the conductor layers 336 and 337) that the resonant circuit of the BPF 20 includes and the longitudinal direction of the transmission lines 31 and 34 (the conductor layers 334 and 335) that the resonant circuit of the BPF 30 includes intersect at a right angle.

The conductor layer 428 of FIG. 12 is connected to the conductor layer 434 via through holes formed in the dielectric layers 208 to 210. The conductor layer 429 of FIG. 12 is connected to the conductor layer 435 via through holes formed in the dielectric layers 208 to 210. In addition, the conductor layer 234 of FIG. 7 is connected to the conductor layer 435 via through holes formed in the dielectric layers 203 to 210. The conductor layer 437 is connected to the terminal G5. The conductor layers 434, 435, 436 and 437 make up the transmission lines 61, 64, 51 and 54 of FIG. 3, respectively. The transmission lines 61, 64, 51 and 54 made up of the conductor layers 434, 435, 436 and 437 are distributed constant lines. In the embodiment the longitudinal direction of the transmission lines 51 and 54 (the conductor layers 436 and 437) that the resonant circuit of the BPF 50 includes and the longitudinal direction of the transmission lines 61 and 64 (the conductor layers 434 and 435) that the resonant circuit of the BPF 60 includes intersect at a right angle.

Figure 16:
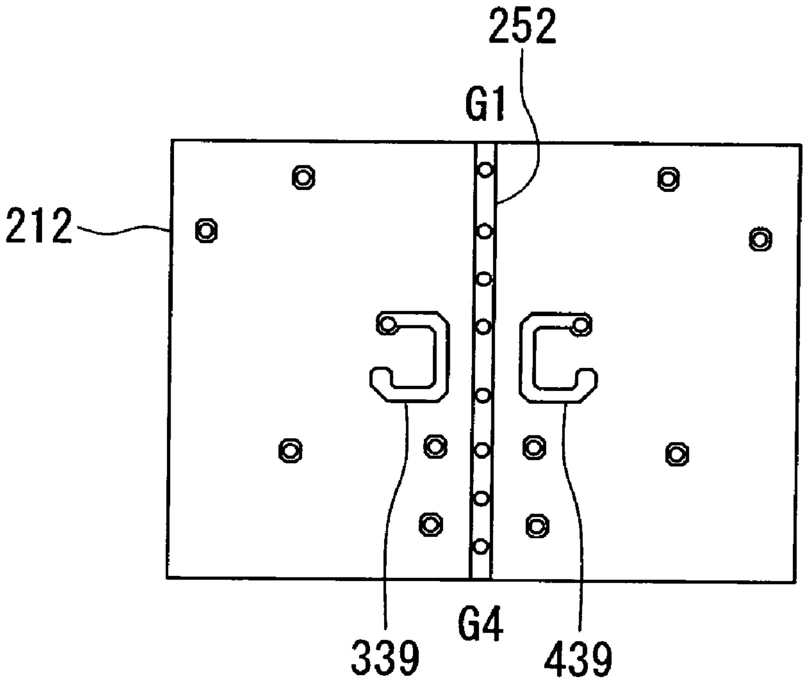
FIG. 16 is a top view illustrating a top surface of a twelfth dielectric layer of the layered substrate of FIG. 1.

On the top surface of the twelfth dielectric layer 212 of FIG. 16, a conductor layer 252 for the ground and conductor layers 339 and 439 for inductors are formed. The conductor layer 252 is connected to the terminals G1 and G4. The conductor layers 243 to 246 of FIG. 14 are connected to the conductor layer 252 via through holes formed in the dielectric layers 210 and 211. The conductor layer 238 of FIG. 13 is connected to the conductor layer 252 via through holes formed in the dielectric layers 209 to 211.

The conductor layer 324 of FIG. 11 is connected to the conductor layer 339 via through holes formed in the dielectric layers 207 to 211. The conductor layer 339 makes up a portion of the inductor 81 of FIG. 3. The conductor layer 424 of FIG. 11 is connected to the conductor layer 439 via through holes formed in the dielectric layers 207 to 211. The conductor layer 439 makes up a portion of the inductor 91 of FIG. 3.

Figure 17:
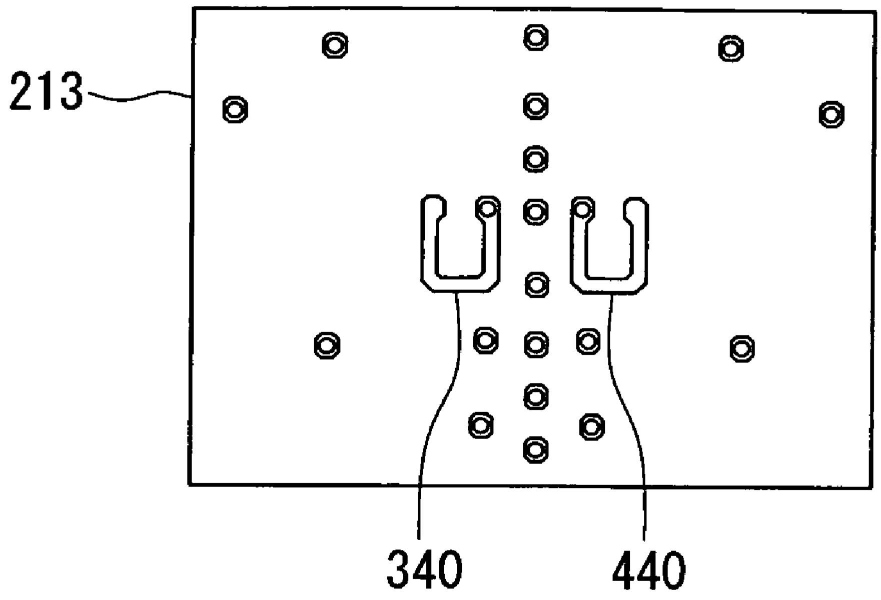
FIG. 17 is a top view illustrating a top surface of a thirteenth dielectric layer of the layered substrate of FIG. 1.

On the top surface of the thirteenth dielectric layer 213 of FIG. 17, conductor layers 340 and 440 for inductors are formed. The conductor layer 339 of FIG. 16 is connected to conductor layer 340 via a through hole formed in the dielectric layer 212. The conductor layer 340 makes up a portion of the inductor 81 of FIG. 3. The conductor layer 439 of FIG. 16 is connected to the conductor layer 440 via a through hole formed in the dielectric layer 212. The conductor layer 440 makes up a portion of the inductor 91 of FIG. 3.

Figure 18:
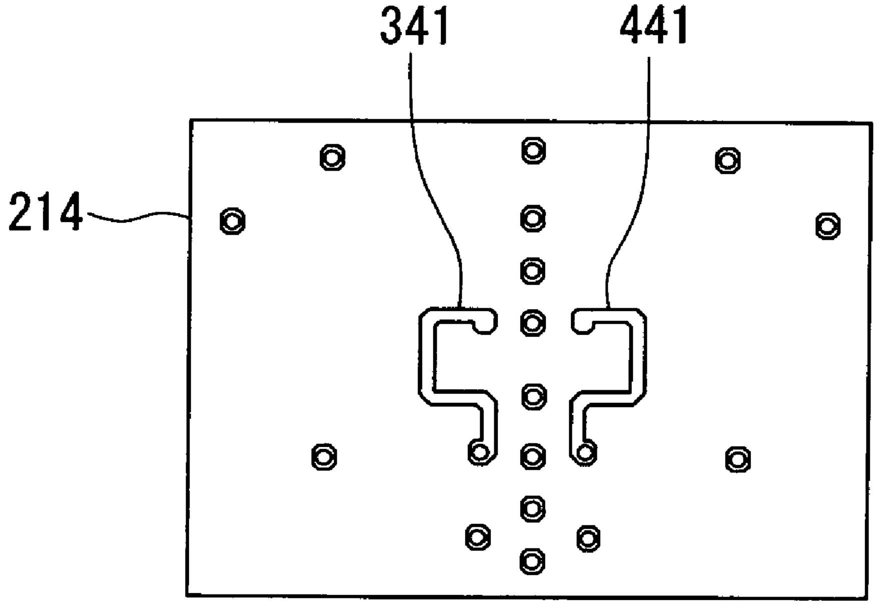
FIG. 18 is a top view illustrating a top surface of a fourteenth dielectric layer of the layered substrate of FIG. 1.

On the top surface of the fourteenth dielectric layer 214 of FIG. 18, conductor layers 341 and 441 for inductors are formed. The conductor layer 340 of FIG. 17 is connected to the conductor layer 341 via a through hole formed in the dielectric layer 213. The inductor 81 of FIG. 3 is made up of the conductor layers 339 to 341. The conductor layer 440 of FIG. 17 is connected to the conductor layer 441 via a through hole formed in the dielectric layer 213. The inductor 91 of FIG. 3 is made up of the conductor layers 439 to 441.

Figure 19:
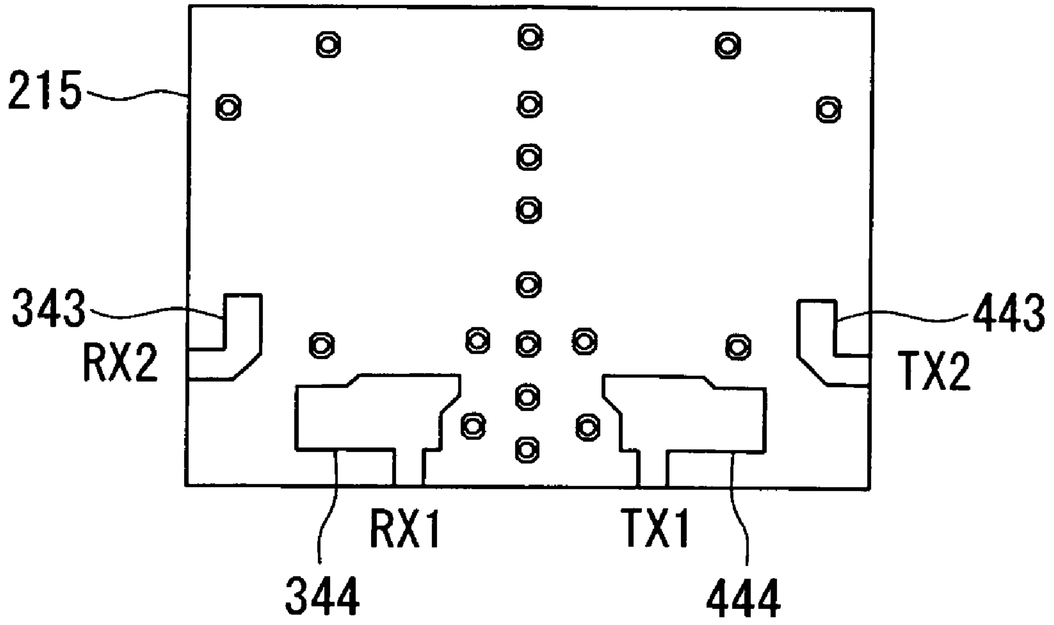
FIG. 19 is a top view illustrating a top surface of a fifteenth dielectric layer of the layered substrate of FIG. 1.

On the top surface of the fifteenth dielectric layer 215 of FIG. 19, conductor layers 343, 344, 443 and 444 for capacitors are formed. The conductor layer 343 is connected to the terminal RX2. The conductor layer 343 makes up a portion of the capacitor 44 of FIG. 3. The conductor layer 344 is connected to the terminal RX1. The conductor layer 344 makes up a portion of the capacitor 82 of FIG. 3. The conductor layer 443 is connected to the terminal TX2. The conductor layer 443 makes up a portion of the capacitor 74 of FIG. 3. The conductor layer 444 is connected to the terminal TX1. The conductor layer 444 makes up a portion of the capacitor 92 of FIG. 3.

Figure 20:
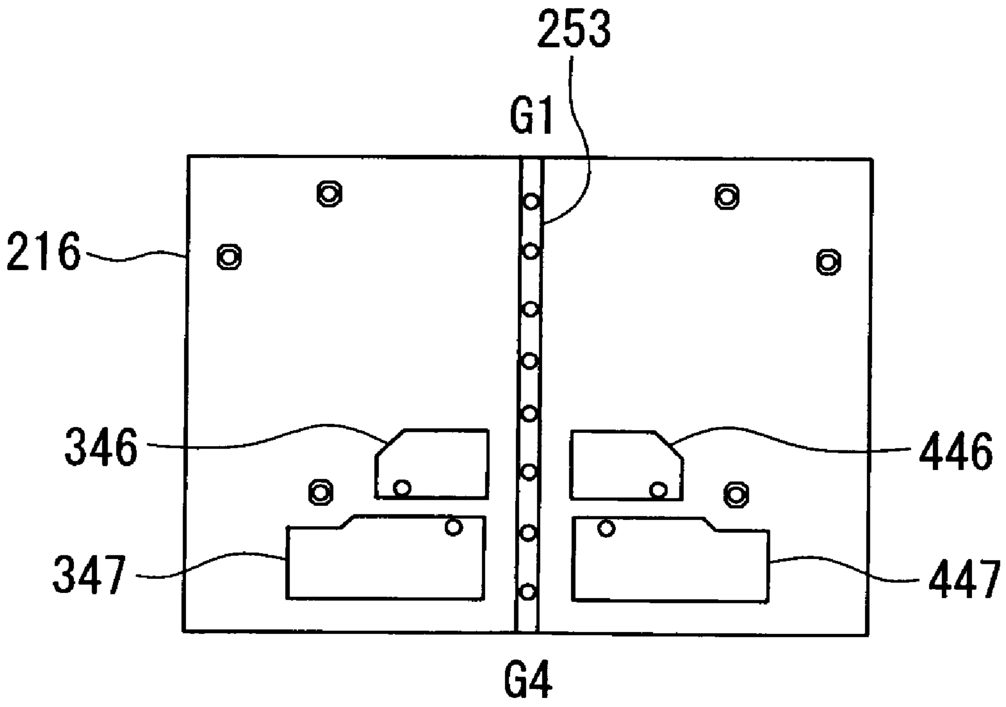
FIG. 20 is a top view illustrating a top surface of a sixteenth dielectric layer of the layered substrate of FIG. 1.

On the top surface of the sixteenth dielectric layer 216 of FIG. 20, a conductor layer 253 for the ground, conductor layers 346 and 446, and conductor layers 347 and 447 for capacitors are formed. The conductor layer 253 is connected to the terminals G1 and G4. The conductor layer 252 of FIG. 16 is connected to the conductor layer 253 via through holes formed in the dielectric layers 212 to 215.

The conductor layer 341 of FIG. 18 is connected to the conductor layer 346 via through holes formed in the dielectric layers 214 and 215. The conductor layer 346 makes up a portion of the capacitor 23 of FIG. 3. The conductor layer 337 of FIG. 15 is connected to the conductor layer 347 via through holes formed in the dielectric layers 211 to 215. The conductor layer 347, together with the conductor layer 344 of FIG. 19, makes up the capacitor 82 of FIG. 3. In addition, the conductor layer 347, together with the conductor layer 346, makes up the capacitor 23 of FIG. 3.

The conductor layer 441 of FIG. 18 is connected to the conductor layer 446 via through holes formed in the dielectric layers 214 and 215. The conductor layer 446 makes up a portion of the capacitor 53 of FIG. 3. The conductor layer 437 of FIG. 15 is connected to the conductor layer 447 via through holes formed in the dielectric layers 211 to 215. The conductor layer 447, together with the conductor layer 444 of FIG. 19, makes up the capacitor 92 of FIG. 3. In addition, the conductor layer 447, together with the conductor layer 446, makes up the capacitor 53 of FIG. 3.

Figure 21:
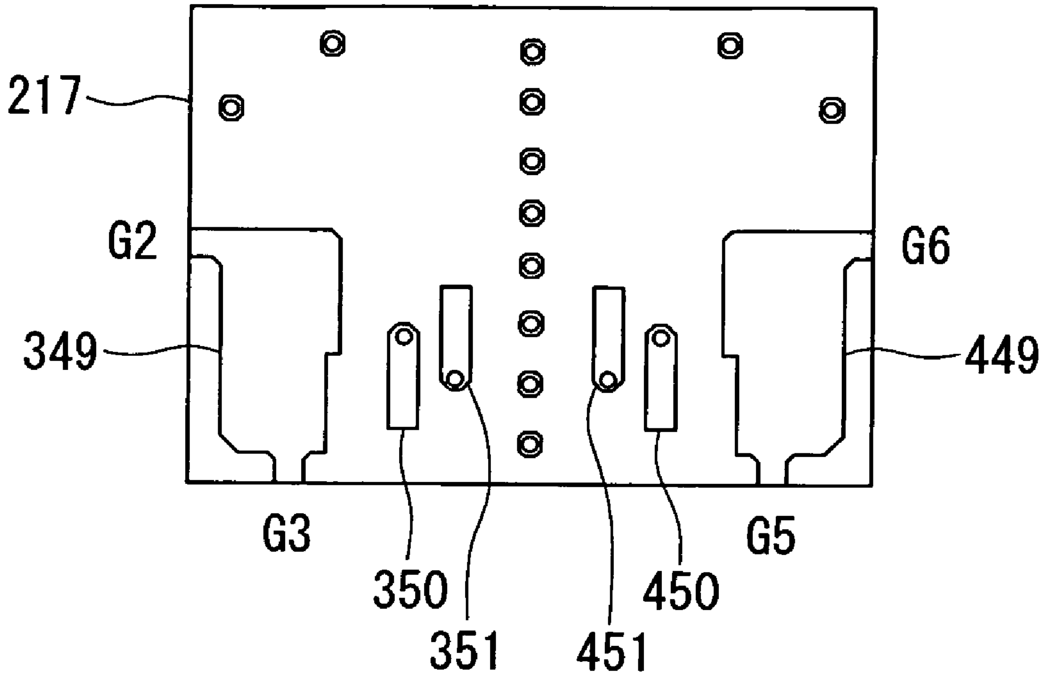
FIG. 21 is a top view illustrating a top surface of a seventeenth dielectric layer of the layered substrate of FIG. 1.

On the top surface of the seventeenth dielectric layer 217 of FIG. 21, conductor layers 349, 350, 351, 449, 450 and 451 for capacitors are formed.

The conductor layer 349 is connected to the terminals G2 and G3. The conductor layer 336 of FIG. 15 is connected to the conductor layer 349 via through holes formed in the dielectric layers 211 to 216. The conductor layer 349, together with the conductor layer 343 of FIG. 19, makes up the capacitor 44 of FIG. 3. The conductor layer 346 of FIG. 20 is connected to the conductor layer 350 via a through hole formed in the dielectric layer 216. The conductor layer 347 of FIG. 20 is connected to the conductor layer 351 via a through hole formed in the dielectric layer 216. The conductor layers 350 and 351 make up the capacitor 23 of FIG. 3.

The conductor layer 449 is connected to the terminals G5 and G6. The conductor layer 436 of FIG. 15 is connected to the conductor layer 449 via through holes formed in the dielectric layers 211 to 216. The conductor layer 449, together with the conductor layer 443 of FIG. 19, makes up the capacitor 74 of FIG. 3. The conductor layer 446 of FIG. 20 is connected to the conductor layer 450 via a through hole formed in the dielectric layer 216. The conductor layer 447 of FIG. 20 is connected to the conductor layer 451 via a through hole formed in the dielectric layer 216. The conductor layers 450 and 451 make up the capacitor 53 of FIG. 3.

Figure 22:
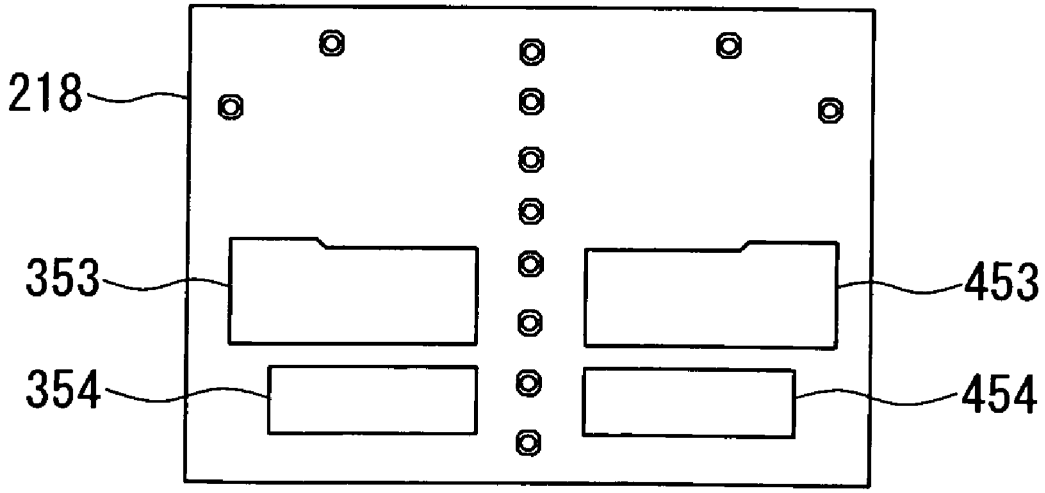
FIG. 22 is a top view illustrating a top surface of an eighteenth dielectric layer of the layered substrate of FIG. 1.

On the top surface of the eighteenth dielectric layer 218 of FIG. 22, conductor layers 353, 354, 453 and 454 for capacitors are formed.

The conductor layer 350 of FIG. 21 is connected to the conductor layer 353 via a through hole formed in the dielectric layer 217. The conductor layer 353 makes up a portion of the capacitor 22 of FIG. 3. The conductor layer 351 of FIG. 21 is connected to the conductor layer 354 via a through hole formed in the dielectric layer 217. The conductor layer 354 makes up a portion of the capacitor 25 of FIG. 3. The conductor layers 353 and 354 make up the capacitor 23 of FIG. 3.

The conductor layer 450 of FIG. 21 is connected to the conductor layer 453 via a through hole formed in the dielectric layer 217. The conductor layer 453 makes up a portion of the capacitor 52 of FIG. 3. The conductor layer 451 of FIG. 21 is connected to the conductor layer 454 via a through hole formed in the dielectric layer 217. The conductor layer 454 makes up a portion of the capacitor 55 of FIG. 3. The conductor layers 453 and 454 makes up the capacitor 53 of FIG. 3.

Figure 23:
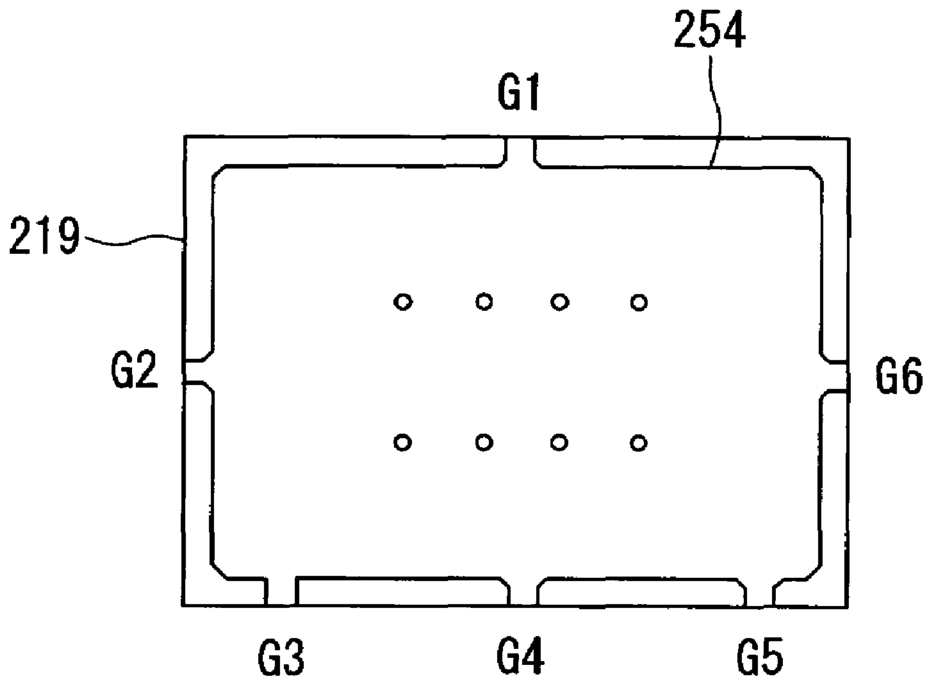
FIG. 23 is a top view illustrating a top surface of a nineteenth dielectric layer of the layered substrate of FIG. 1.

On the top surface of the nineteenth dielectric layer 219 of FIG. 23, a conductor layer 254 for the ground is formed. The conductor layer 254 is connected to the terminals G1 to G6. The conductor layer 254, together with the conductor layer 353 of FIG. 22, makes up the capacitor 22 of FIG. 3. In addition, the conductor layer 254, together with the conductor layer 354 of FIG. 22, makes up the capacitor 25 of FIG. 3. The conductor layer 254, together with the conductor layer 453 of FIG. 22, makes up the capacitor 52 of FIG. 3. The conductor layer 254, together with the conductor layer 454 of FIG. 22, makes up the capacitor 55 of FIG. 3.

The conductor layer 253 of FIG. 20 is connected to the conductor layer 254 via through holes formed in the dielectric layers 216 to 218. In addition, the conductor layers 334 and 434 of FIG. 15 are connected to the conductor layer 254 via through holes formed in the dielectric layers 211 to 218. Furthermore, the conductor layers 333 and 433 of FIG. 14 are connected to the conductor layer 254 via through holes formed in the dielectric layers 210 to 218. Eight through holes connected to the conductor layer 254 are formed in the dielectric layer 219.

Figure 24:
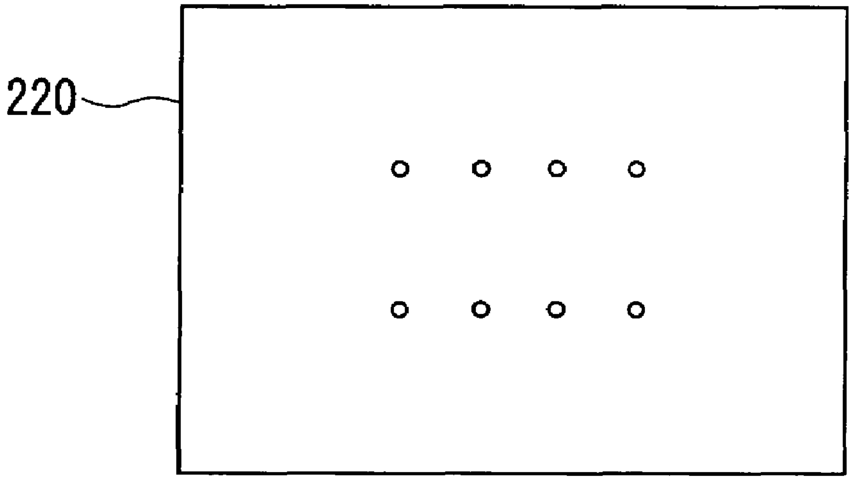
FIG. 24 is a top view illustrating a top surface of a twentieth dielectric layer of the layered substrate of FIG. 1.
Figure 25:
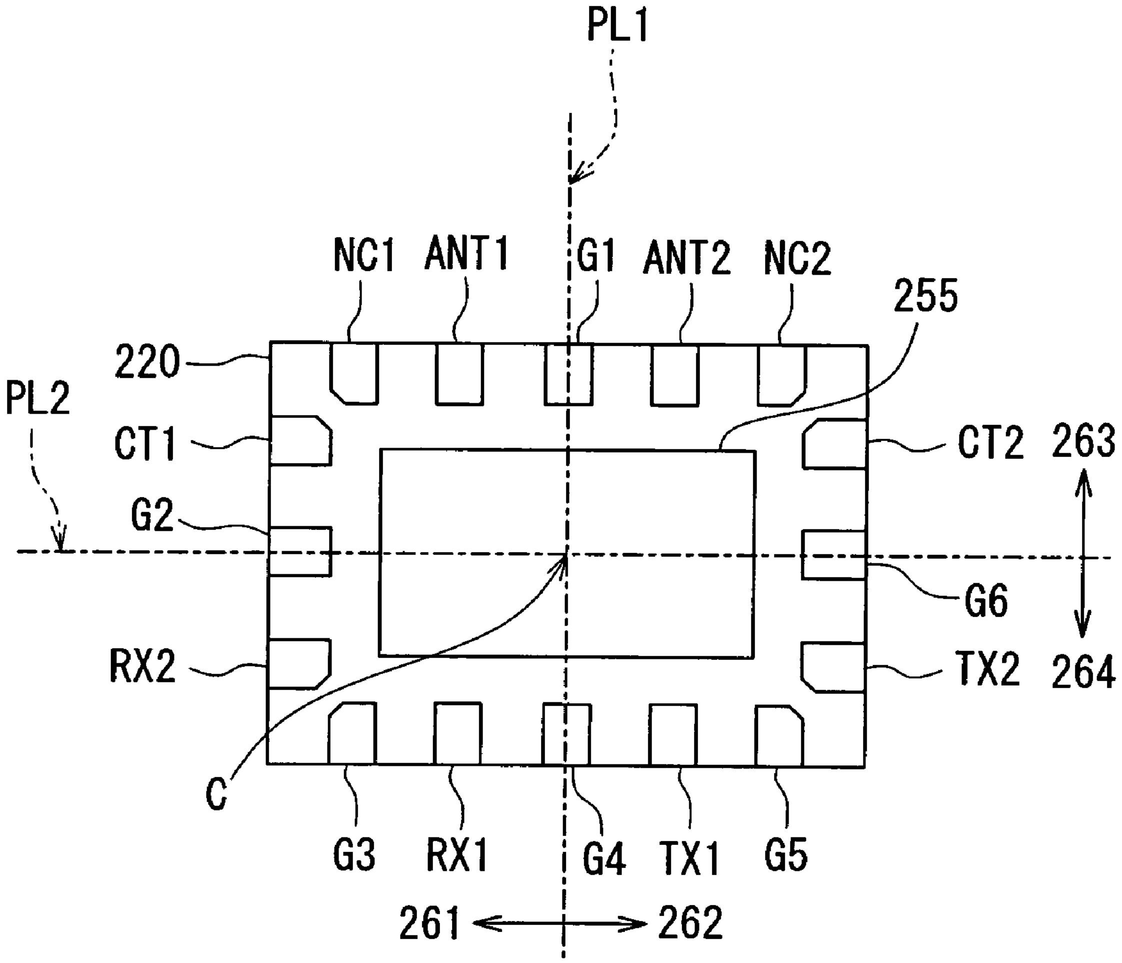
FIG. 25 is a top view illustrating the twentieth dielectric layer and a conductor layer therebelow of the layered substrate of FIG. 1.

The twentieth dielectric layer 220 of FIG. 24 has eight through holes connected to the eight through holes formed in the dielectric layer 219.

As shown in FIG. 25, conductor layers making up the terminals ANT1, ANT2, RX1, RX2, TX1, TX2, CT1, CT2, G1 to G6, NC1 and NC2, and a conductor layer 255 for the ground are formed on the lower surface of the dielectric layer 220, that is, the bottom surface of the layered substrate 200. The conductor layer 254 of FIG. 23 is connected to the conductor layer 255 via the through holes formed in the dielectric layers 219 and 220. The area of the conductor layer 255 that occupies the bottom surface of the layered substrate 200 is greater than the area of each of the terminals that occupies the bottom surface of the layered substrate 200.

Characteristics of the high frequency module 1 of the embodiment will now be described. In the embodiment the diplexers 11 and 12 are provided inside the layered substrate 200, and the switch circuit 10 is mounted on the layered substrate 200. The terminals ANT1, ANT2, RX1, RX2, TX1, TX2, CT1, CT2, G1 to G6, NC1 and NC2 are disposed on the surface of the layered substrate 200, particularly to extend from the top surface to the bottom surface through the side surfaces of the layered substrate 200.

As shown in FIG. 5 and FIG. 25, the layered substrate 200 includes a first region 261 and a second region 262 separated from each other by an imaginary plane PL1 that passes through the center C of the bottom surface of the layered substrate 200 and intersects the bottom surface of the layered substrate 200 at a right angle. Inside the layered substrate 200, the diplexer 11 is located in the first region 261 while the diplexer 12 is located in the second region 262. As a result, according to the embodiment, it is possible to improve the isolation between the diplexers 11 and 12.

In the embodiment the first antenna terminal ANT1, the first reception signal terminal RX1, the second reception signal terminal RX2, and the first control terminal CT1 are located in the first region 261. The second antenna terminal ANT2, the first transmission signal terminal TX1, the second transmission signal terminal TX2, and the second control terminal CT2 are located in the second region 262. As a result, according to the embodiment, it is possible to reduce the length of the transmission line connecting the circuitry located inside the layered substrate 200 to the terminals located on the surface of the layered substrate 200. It is thereby possible to reduce the loss and noise that occur in the high frequency module 1.

In the embodiment the locations of the first antenna terminal ANT1 and the second antenna terminal ANT2, the locations of the first reception signal terminal RX1 and the first transmission signal terminal TX1, the locations of the second reception signal terminal RX2 and the second transmission signal terminal TX2, and the locations of the first control terminal CT1 and the second control terminal CT2 are symmetric, respectively, with respect to the imaginary plane PL1. As a result, according to the embodiment, it is possible to make the pattern of the conductor layers that form the diplexer 11 and the pattern of the conductor layers that form the diplexer 12 symmetric with respect to the imaginary plane PL1. As shown in FIG. 5 to FIG. 25, the pattern of the conductor layers that form the diplexer 11 and the pattern of the conductor layers that form the diplexer 12 are actually symmetric with respect to the imaginary plane PL1 in the embodiment. It is therefore possible to easily design the pattern of the conductor layers of the layered substrate 200 and to further reduce the time required for design.

The ground terminals G1 to G6 and the terminals NC1 and NC2 are not used for receiving and outputting signals. Here, these terminals G1 to G6 and NC1 and NC2 are called non-I/O terminals. In addition, the terminals ANT1, ANT2, RX1, RX2, TX1, TX2, CT1 and CT2 are called I/O terminals. In the embodiment, each of the non-I/O terminals is placed between adjacent ones of the I/O terminals on the surface of the layered substrate 200 without exception. As a result, according to the embodiment, it is possible to prevent electromagnetic interference between the respective adjacent ones of the I/O terminals. In addition, according to the embodiment, it is possible to improve the isolation between the two antenna terminals ANT1 and ANT2.

In the embodiment at least a portion of each of the terminals is located on the bottom surface of the layered substrate 200. The high frequency module 1 of the embodiment comprises the conductor layer 255 for the ground that is located in the region surrounded by the terminals on the bottom surface of the layered substrate 200 and that is connected to the ground. The area of the conductor layer 255 that occupies the bottom surface of the layered substrate 200 is greater than the area of each of the terminals that occupies the bottom surface of the layered substrate 200. As a result, according to the embodiment, it is possible to enhance the strength of the bottom surface of the layered substrate 200 on which the terminals are located and to improve the strength of joint between the high frequency module 1 and a mounting board when the high frequency module 1 is mounted on the mounting board.

Figure 28:
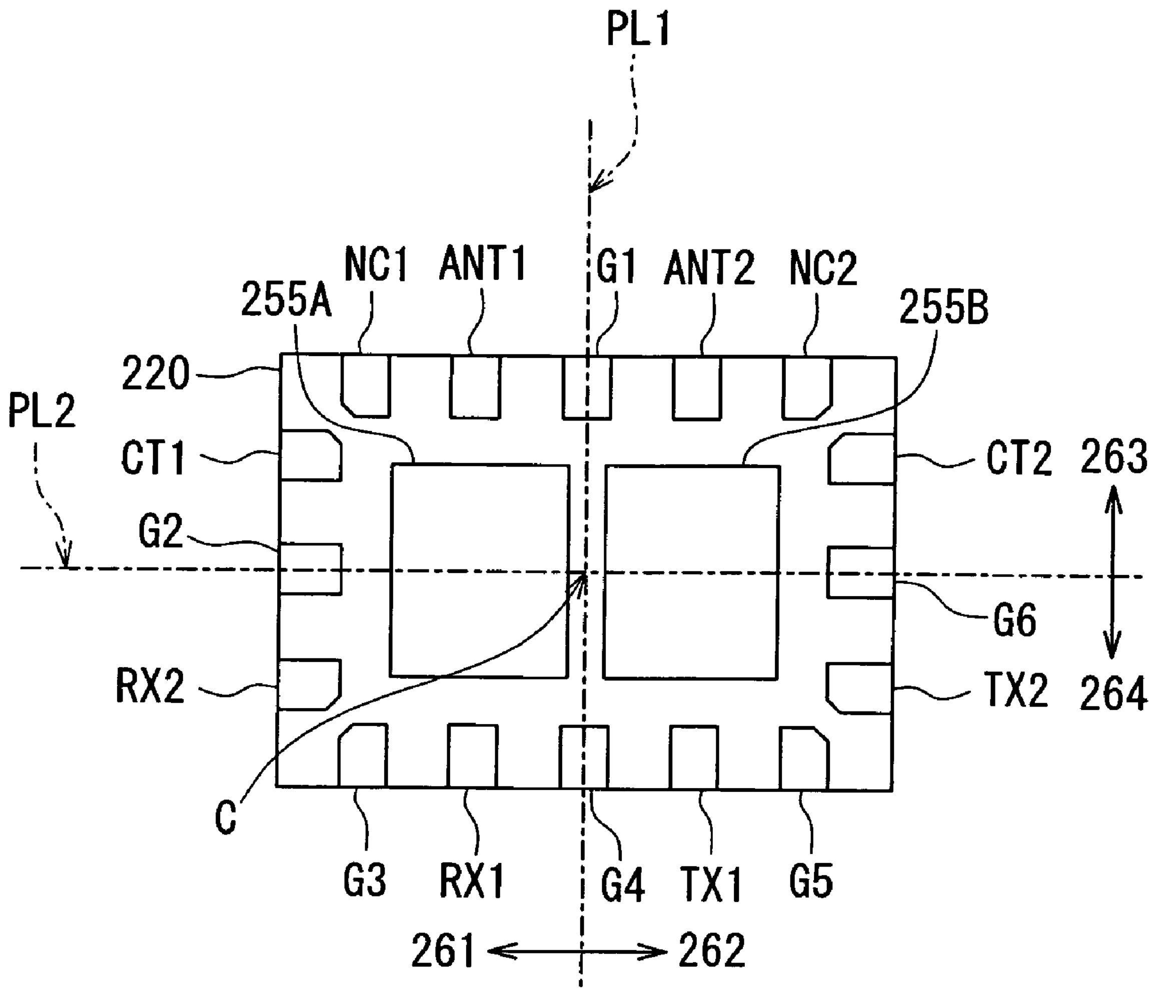
FIG. 28 is a top view illustrating a twentieth dielectric layer and a conductor layer therebelow of a layered substrate of a modification example of the first embodiment of the invention.
Figure 29:
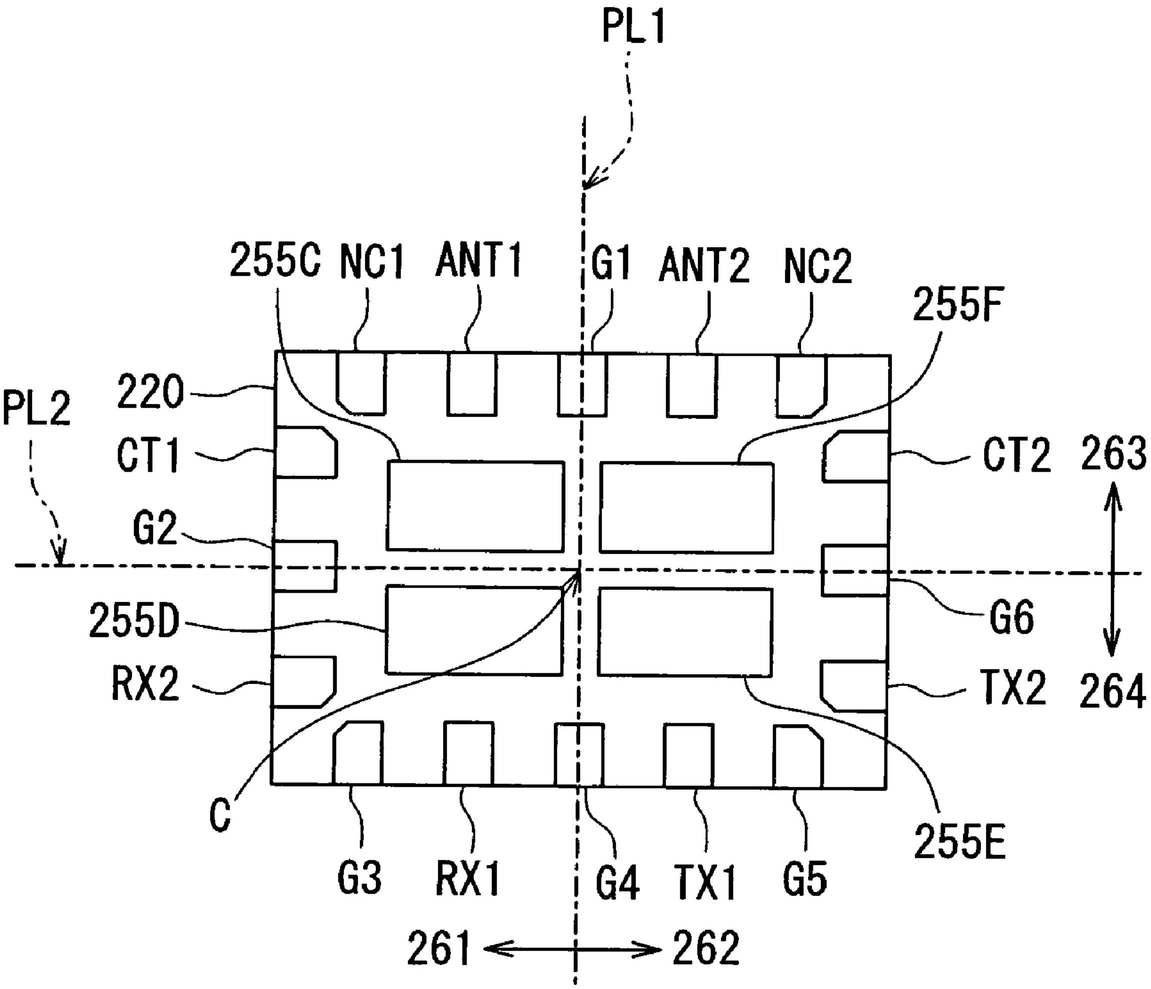
FIG. 29 is a top view illustrating a twentieth dielectric layer and a conductor layer therebelow of a layered substrate of another modification example of the first embodiment of the invention.

It is not necessarily required that only a single conductor layer for the ground be located in the region surrounded by the terminals on the bottom surface of the layered substrate 200 like the conductor layer 255 of FIG. 25, but a plurality of conductor layers for the ground may be provided in the region. FIG. 28 shows an example in which two conductor layers 255A and 255B for the ground are provided in place of the conductor layer 255. There is a gap between the conductor layers 255A and 255B. FIG. 29 shows an example in which four conductor layers 255C to 255F for the ground are provided in place of the conductor layer 255. There are gaps among the conductor layers 255C to 255F. FIG. 28 and FIG. 29 each show the twentieth dielectric layer of the layered substrate 200 from the top and the conductor layer therebelow seen from above. By providing a plurality of conductor layers for the ground on the bottom surface of the layered substrate 200 as in these examples, deformation such as warp of the layered substrate 200 is suppressed.

Figure 26:
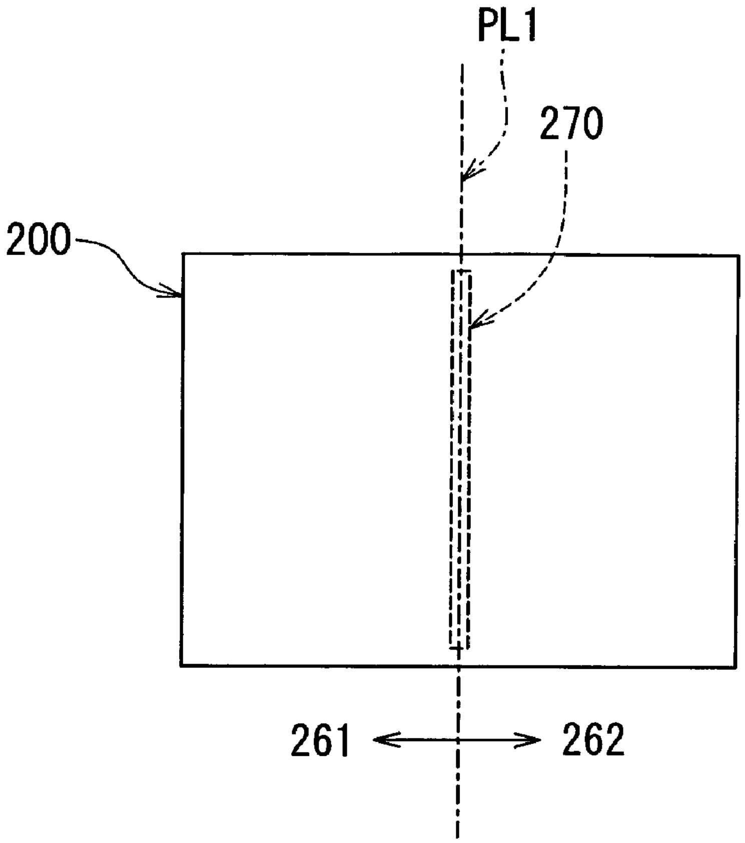
FIG. 26 is a view for illustrating a conductor portion provided inside the layered substrate of FIG. 1.

In the embodiment a plurality of terminals G1 and G4 for the ground each of which is connected to the ground are placed at locations that intersect the imaginary plane PL1 on the surface of the layered substrate 200. In addition, as shown in FIG. 26, the high frequency module 1 of the embodiment comprises a conductor portion 270 that is located inside the layered substrate 200 in a region including the imaginary plane PL1 and is connected to the ground and that electromagnetically separates the diplexers 11 and 12 from each other. The conductor portion 270 is formed using a plurality of through holes that are formed in a plurality of dielectric layers inside the layered substrate 200 and that are connected to the ground. The conductor portion 270 is connected to the ground through the ground terminals G1 to G6 and electromagnetically separates the diplexers 11 and 12 from each other.

Figure 27:
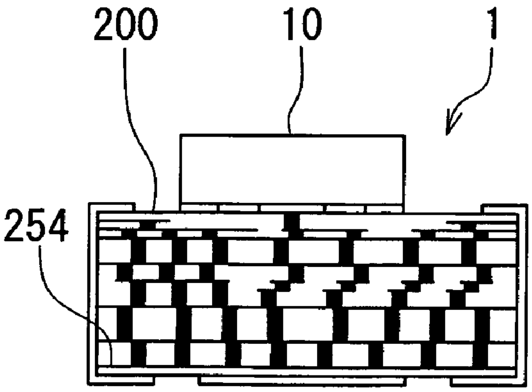
FIG. 27 is a cross-sectional view of the high frequency module for illustrating the conductor portion of the first embodiment of the invention.

FIG. 27 is a cross-sectional view of the high frequency module 1 for illustrating the conductor portion 270, which shows a cross section taken at the position of the imaginary plane PL1 of FIG. 5 and FIG. 25. Inside the layered substrate 200 shown in FIG. 27, solidly shaded rectangular portions indicate through holes, and straight lines extending in the horizontal direction indicate conductor layers. The layered substrate 200 includes the conductor layer 254 for the ground that is connected to the ground and that is located closer to the bottom surface of the layered substrate 200 than the region in which the diplexers 11 and 12 are located. The plurality of through holes used to form the conductor portion 270 are connected to the conductor layer 254.

In the embodiment the conductor portion 270 is provided so that it is possible to prevent reception signals from leaking from the diplexer 11 to the diplexer 12 and to prevent transmission signals from leaking from the diplexer 12 to the diplexer 11 inside the layered substrate 200. As a result, according to the embodiment, it is possible to improve the isolation between the diplexers 11 and 12. It is thereby possible to form the diplexers 11 and 12 of higher densities inside the layered substrate 200 and to thereby make the high frequency module 1 smaller in size.

The conductor portion 270 formed using of the plurality of through holes is stripe-shaped as shown in FIG. 27. As a result, according to the embodiment, it is possible to make stray capacitance resulting from the conductor section 270 smaller, compared with the case in which the diplexers 11 and 12 are isolated by a plate-shaped conductor section having a larger area. It is thereby possible to form the diplexers 11 and 12 of higher densities inside the layered substrate 200 and to thereby make the high frequency module 1 smaller in size.

In the embodiment, as shown in FIG. 5 and FIG. 25, the layered substrate 200 includes a third region 263 and a fourth region 264 that are separated from each other by a second imaginary plane PL2. The second imaginary plane PL2 passes through the center C of the bottom surface of the layered substrate 200, intersects the bottom surface of the layered substrate 200 at a right angle, and intersects the imaginary plane PL1 at a right angle, the imaginary plane PL1 separating the first region 261 and the second region 262 from each other. In the embodiment the antenna terminals ANT1 and ANT2 are located in the third region 263 while the reception signal terminals RX1 and RX2 and the transmission signal terminals TX1 and TX2 are located in the fourth region 264. Such arrangement reduces unwanted portions of the transmission lines between the reception signal terminals RX1, RX2 and the transmission signal terminals TX1, TX2. It is thereby possible to reduce the loss and noise that occur in the high frequency module 1.

In the high frequency module 1 of the embodiment, the diplexer 11 incorporates the BPFs 20 and 30 and the diplexer 12 incorporates the BPFs 50 and 60. The diplexers 11 and 12 may be formed using high-pass filters and low-pass filters without using BPFs. In this case, however, a number of filters are required in the circuits connected to the high frequency module 1, and strict conditions are imposed on the filters provided in the circuits connected to the high frequency module 1. In the embodiment, in contrast, the diplexers 11 and 12 are made up of the BPFs, so that the number of filters provided in the circuits connected to the high frequency module 1 is reduced, and the conditions required for the filters provided in the circuits connected to the high frequency module 1 are relieved.

The BPFs 20, 30, 50 and 60 are formed using the resonant circuits. It is possible to use a combination of a high-pass filter and a low-pass filter to form the BPFs. In this case, however, the number of elements making up the BPFs increases, and it is difficult to adjust the characteristics of the BPFs. In the embodiment, in contrast, the BPFs are formed using the resonant circuits, so that the number of elements making up the BPFs is reduced, and it is easy to adjust the characteristics of the BPFs.

The switch circuit 10 and the diplexers 11 and 12 are integrated through the use of the layered substrate 200. As a result, it is possible to reduce the mounting area of the high frequency module 1. For example, if two discrete diplexers 3.2 mm long and 1.6 mm wide and a single discrete switch 3.0 mm long and 3.0 mm wide are mounted on a substrate to form a high frequency module, the mounting area of the high frequency module including the land is approximately 23 $mm^2$. In the embodiment, in contrast, the mounting area of the high frequency module 1 including the land is approximately 16 $mm^2$. Therefore, according to the embodiment, it is possible to reduce the mounting area by approximately 30 percent as compared with the case in which the two discrete diplexers and the single discrete switch are mounted on the substrate to form a high frequency module.

According to the embodiment, the number of steps required for mounting the components is smaller, compared with the case in which two discrete diplexers and a single discrete switch are mounted on a substrate to form a high frequency module. It is therefore possible to reduce costs required for mounting the components.

According to the embodiment, as thus described, it is possible to implement the high frequency module 1 that is used in a communications apparatus for a wireless LAN, capable of processing transmission and reception signals of a plurality of frequency bands, and capable of achieving a reduction in size and an improvement in characteristics.

The high frequency module 1 for a wireless LAN of the embodiment is mainly installed in an apparatus that requires a reduction in size or profile, such as a notebook personal computer. It is therefore preferred that the high frequency module 1 be 5 mm long or smaller, 4 mm wide or smaller, and 2 mm high or smaller.

The high frequency module 1 comprises the two antenna terminals ANT1 and ANT2, and the switch circuit 10 connects one of the diplexers 11 and 12 to one of the antenna terminals ANT1 and ANT2. As a result, according to the embodiment, it is possible to implement the high frequency module 1 provided for a diversity.

In the high frequency module 1, the layered substrate 200 including the dielectric layers and the conductor layers alternately stacked is used as a substrate for integrating the components. In addition, the resonant circuits used to form the BPFs 20, 30, 50 and 60 are formed using some of the dielectric layers and some of the conductor layers of the layered substrate 200. As a result, according to the embodiment, it is possible to further reduce the high frequency module 1 in dimensions.

In the embodiment, each of the resonant circuits includes the distributed constant line formed using one of the conductor layers. As a result, the embodiment exhibits the following effects. For the high frequency circuit section for a wireless LAN, such a passing characteristic along the path of each signal is getting expected that great attenuation is obtained in a frequency region outside the pass band. To satisfy this requirement, it is desired that the frequency characteristic of insertion loss of the BPFs 20, 30, 50 and 60 be such that the insertion loss abruptly changes near the boundary between the pass band and a frequency region outside the pass band. To achieve such a characteristic with BPFs made up of lumped constant elements only, it is required to increase the degree of the filters. Consequently, the number of elements making up the BPFs is increased. It is therefore difficult to reduce the high frequency module in size and to achieve desired characteristics of the BPFs since the number of elements to adjust is great. In contrast, as in the embodiment, if the resonant circuits used to form the BPFs 20, 30, 50 and 60 include distributed constant lines, it is possible to reduce the number of elements and to make adjustment for achieving desired characteristics more easily, compared with the case in which the BPFs are made up of lumped constant elements only. Therefore, according to the embodiment, it is possible to further reduce the high frequency module 1 in size and to achieve desired characteristics of the BPFs 20, 30, 50 and 60 more easily.

In the embodiment, each of the resonant circuits includes the transmission lines each of which is formed using one of the conductor layers and has an inductance. The longitudinal direction of the transmission lines 21, 24 (the conductor layers 336, 337) that the resonant circuit of the BPF 20 includes and the longitudinal direction of the transmission lines 31, 34 (the conductor layers 334, 335) that the resonant circuit of the BPF 30 includes intersect at a right angle. It is thereby possible to prevent electromagnetic coupling between the transmission lines 21, 24 (the conductor layers 336, 337) and the transmission lines 31, 34 (the conductor layers 334, 335). As a result, it is possible to prevent electromagnetic interference between the BPF 20 and the BPF 30.

Similarly, the longitudinal direction of the transmission lines 51, 54 (the conductor layers 436, 437) that the resonant circuit of the BPF 50 includes and the longitudinal direction of the transmission lines 61, 64 (the conductor layers 434, 435) that the resonant circuit of the BPF 60 includes intersect at a right angle. It is thereby possible to prevent electromagnetic coupling between the transmission lines 51, 54 (the conductor layers 436, 437) and the transmission lines 61, 64 (the conductor layers 434, 435). As a result, it is possible to prevent electromagnetic interference between the BPF 50 and the BPF 60.

In the embodiment, the switch circuit 10 is mounted on the layered substrate 200, and the conductor layers of the layered substrate 200 include the conductor layers 233 to 235 for the ground (see FIG. 7) that are connected to the ground and disposed between the switch circuit 10 and all the resonant circuits. As a result, according to the embodiment, it is possible to prevent electromagnetic interference between the switch circuit 10 and the diplexers 11, 12.

In the embodiment, the diplexer 11 incorporates the LPF 40 that is connected in series to the BPF 30 and that allows reception signals in the second frequency band to pass. The diplexer 12 incorporates the LPF 70 that is connected in series to the BPF 60 and that allows transmission signals in the second frequency band to pass. If the number of stages of resonant circuits is increased in the BPFs 30 and 60, it is possible to increase the insertion loss outside the second frequency band. However, the insertion loss in the second frequency band also increases. According to the embodiment, in contrast, it is possible to increase the insertion loss at frequencies higher than the second frequency band while suppressing an increase in insertion loss in the second frequency band along the paths of the reception signal and the transmission signal in the second frequency band.

In the embodiment, the layered substrate 200 may be chosen out of a variety of types of substrates, such as one in which the dielectric layers are made of a resin, a ceramic, or a combination of these. However, it is preferred that the layered substrate 200 be a multilayer substrate of low-temperature co-fired ceramic that exhibits an excellent high frequency characteristic. It is preferred that, as described with reference to FIG. 5 to FIG. 25, the layered substrate 200 that is the multilayer substrate of low-temperature co-fired ceramic incorporate at least a plurality of inductance elements (inductors and transmission lines having inductances) and capacitance elements (capacitors) for forming each of the diplexers 11 and 12. Furthermore, it is preferred that the switch circuit 10 be formed using a field-effect transistor made of a GaAs compound semiconductor and mounted on the layered substrate 200 that is the multilayer substrate of low-temperature co-fired ceramic, as shown in FIG. 2. In addition, it is preferred that, as shown in FIG. 2, a plurality of terminals be provided on the periphery of the layered substrate 200 that is the multilayer substrate of low-temperature co-fired ceramic, the terminals including: the antenna terminals ANT1 and ANT2 for connecting the switch circuit 10 to the antennas; the reception signal terminals RX1 and RX2 and the transmission signal terminals TX1 and TX2 for connecting the diplexers 11 and 12 to external circuits; the control terminals CT1 and CT2; and the ground terminals G1 to G6 connected to the ground.

Second Embodiment

Figure 30:
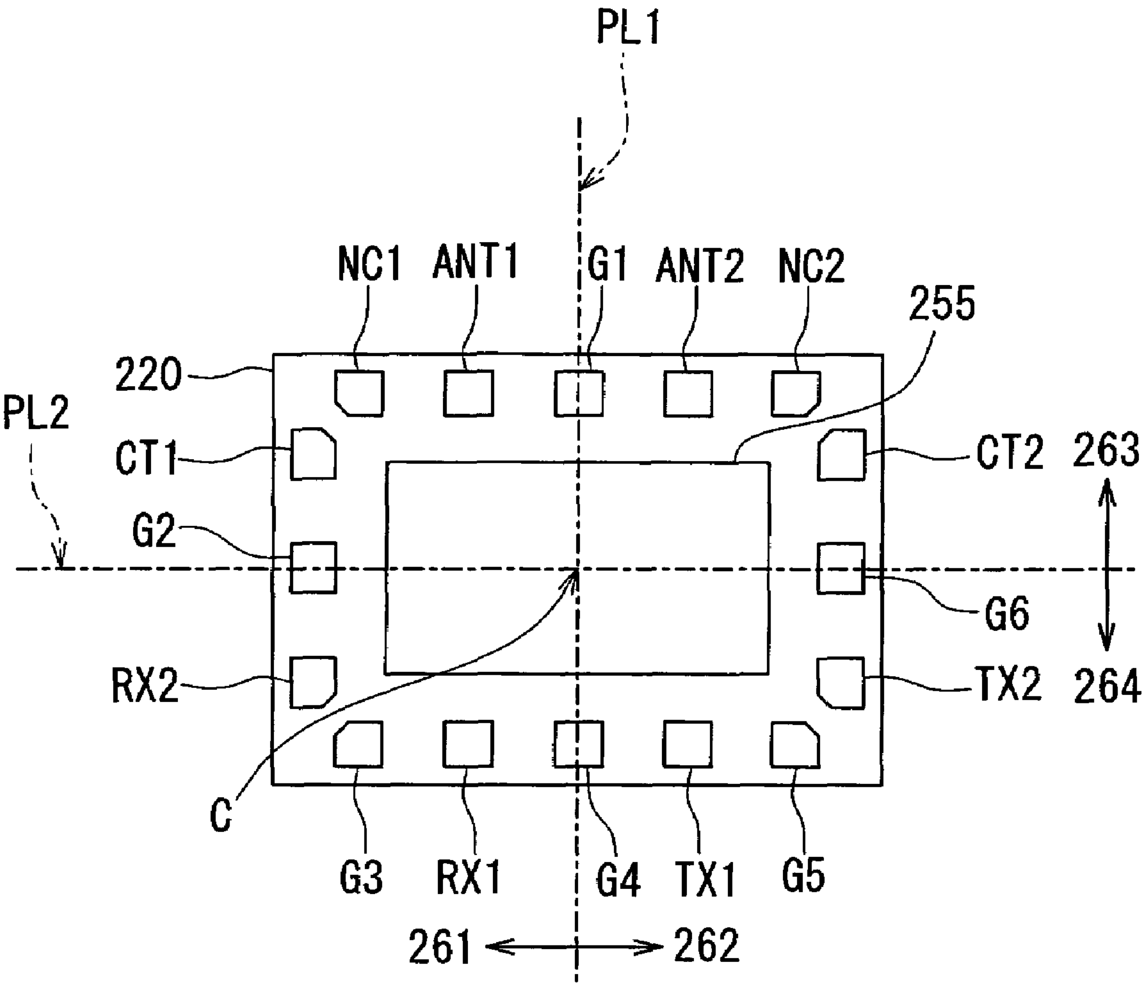
FIG. 30 is a top view illustrating a twentieth dielectric layer and a conductor layer therebelow of a layered substrate of a second embodiment of the invention.

Reference is now made to FIG. 30 to describe a high frequency module of a second embodiment of the invention. FIG. 30 illustrates the twentieth dielectric layer 220 from the top of the layered substrate 200 of the high frequency module 1 of the second embodiment and the conductor layer therebelow seen from above.

In the second embodiment, as shown in FIG. 30, the terminals are located only on the bottom surface of the layered substrate 200 (on the lower surface of the dielectric layer 220). The pattern of the conductor layers inside the layered substrate 200 of the second embodiment may be such one that a plurality of conductor layers located at different levels are connected by using through holes in place of the terminals located on the side surfaces of the layered substrate 200 of the first embodiment. The remainder of configuration, function and effects of the second embodiment are similar to those of the first embodiment.

Third Embodiment

Figure 31:
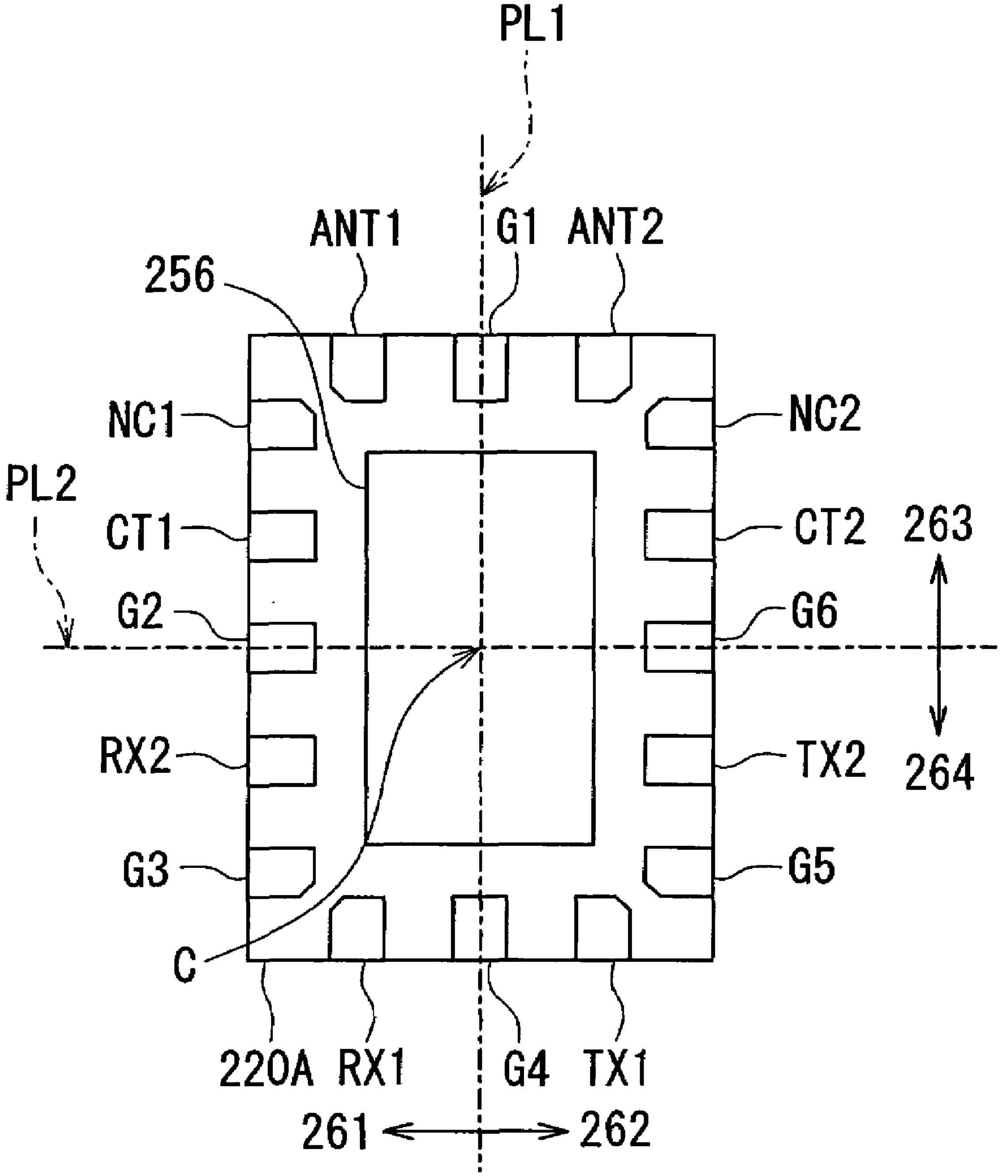
FIG. 31 is a top view illustrating a twentieth dielectric layer and a conductor layer therebelow of a layered substrate of a third embodiment of the invention.

Reference is now made to FIG. 31 to describe a high frequency module of a third embodiment of the invention. FIG. 31 illustrates a twentieth dielectric layer 220A from the top of the layered substrate 200 of the high frequency module 1 of the third embodiment and the conductor layer therebelow seen from above.

In the first embodiment, as shown in FIG. 25, the plane geometry of the layered substrate 200 is a rectangle that is horizontally long when seen with the side on which the antenna terminals ANT1 and ANT2 are located at the top. In contrast, according to the third embodiment, the plane geometry of the layered substrate 200 is a rectangle that is vertically long when seen with the side on which the antenna terminals ANT1 and ANT2 are located at the top, as shown in FIG. 31. In this rectangle two shorter sides are called a first side (the upper side of FIG. 31) and a second side (the lower side of FIG. 31) while two longer sides are called a third side (the left-hand side of FIG. 31) and a fourth side (the right-hand side of FIG. 31).

On the first side, the terminal G1 is placed in the middle, and the terminals ANT1 and ANT2 are placed on both sides of the terminal G1, respectively. On the second side, the terminal G4 is placed in the middle, and the terminals RX1 and TX1 are placed on both sides of the terminal G4, respectively. On the third side, the terminal G2 is placed in the middle, the terminals CT1 and NC1 are placed between the terminal G2 and the first side, the terminal CT1 being closer to the terminal G2, and the terminals RX2 and G3 are placed between the terminal G2 and the second side, the terminal RX2 being closer to the terminal G2. On the fourth side, the terminal G6 is placed in the middle, the terminals CT2 and NC2 are placed between the terminal G6 and the first side, the terminal CT2 being closer to the terminal G6, and the terminals TX2 and G5 are placed between the terminal G6 and the second side, the terminal TX2 being closer to the terminal G6.

In the region surrounded by the terminals on the bottom surface of the layered substrate 200, a conductor layer 256 for the ground is provided in place of the conductor layer 255 for the ground of the first embodiment. The area of the conductor layer 256 that occupies the bottom surface of the layered substrate 200 is greater than the area of each of the terminals that occupies the bottom surface of the layered substrate 200. In place of the conductor layer 256, two or four conductor layers for the ground, for example, may be provided as in the examples shown in FIG. 28 and FIG. 29.

The order of arrangement of the terminals of the fourth embodiment is the same as that of the first embodiment. Consequently, the pattern of the conductor layers inside the layered substrate 200 of the fourth embodiment is basically similar to that of the first embodiment except a small difference in geometry. The remainder of configuration, function and effects of the fourth embodiment are similar to those of the first embodiment.

The present invention is not limited to the foregoing embodiments but may be practiced in still other ways. For example, the arrangement of the terminals of the invention is not limited to the ones disclosed in the embodiments. For example, the locations of the terminals RX1 and RX2 may be the reverse, and the locations of the terminals TX1 and TX2 may be the reverse.

Obviously many modifications and variations of the present invention are possible in the light of the above teachings. It is therefore to be understood that within the scope of the appended claims the invention may be practiced otherwise than as specifically described.

What is claimed is:

1. A high frequency module comprising:

a first antenna terminal and a second antenna terminal that are connected to separate antennas;

a first reception signal terminal for outputting a reception signal in a first frequency band;

a second reception signal terminal for outputting a reception signal in a second frequency band higher than the first frequency band;

a first transmission signal terminal for receiving a transmission signal in the first frequency band;

a second transmission signal terminal for receiving a transmission signal in the second frequency band;

a switch circuit connected to the first and second antenna terminals;

a first diplexer connected to the first and second reception signal terminals and the switch circuit and separating the reception signal in the first frequency band and the reception signal in the second frequency band from each other;

a second diplexer connected to the first and second transmission signal terminals and the switch circuit and separating the transmission signal in the first frequency band and the transmission signal in the second frequency band from each other; and a layered substrate including dielectric layers and conductor layers alternately stacked and integrating the foregoing components, wherein:

the switch circuit is provided for connecting one of the first and second diplexers to one of the first and second antenna terminals;

the first and second diplexers are provided inside the layered substrate;

the foregoing terminals are located on a surface of the layered substrate;

the layered substrate includes a first region and a second region that are divided from each other by an imaginary plane that passes through a center of a bottom surface of the layered substrate and that intersects the bottom surface of the layered substrate at a right angle;

the first diplexer, the first antenna terminal, the first reception signal terminal and the second reception signal terminal are located in the first region;

the second diplexer, the second antenna terminal, the first transmission signal terminal and the second transmission signal terminal are located in the second region; and locations of the first and second antenna terminals, locations of the first reception signal terminal and the first transmission signal terminal, and locations of the second reception signal terminal and the second transmission signal terminal are symmetric, respectively, with respect to the imaginary plane.

2. The high frequency module according to claim 1, further comprising a first control terminal and a second control terminal receiving first and second control signals for switching a state of the switch circuit, wherein:

the first control terminal is located in the first region;

the second control terminal is located in the second region; and the first and second control terminals are placed at locations symmetric with respect to the imaginary plane.

3. The high frequency module according to claim 1, further comprising a plurality of non-input/output terminals that are not used for inputting and outputting signals and that are respectively located between adjacent ones of the terminals on the surface of the layered substrate.

4. The high frequency module according to claim 1, wherein:

at least part of each of the terminals is located on the bottom surface of the layered substrate;

the high frequency module further comprises a conductor layer for a ground that is connected to the ground and located in a region surrounded by the terminals on the bottom surface of the layered substrate; and an area of the conductor layer for the ground that occupies the bottom surface of the layered substrate is greater than an area of each of the terminals that occupies the bottom surface of the layered substrate.

5. The high frequency module according to claim 1, further comprising a plurality of terminals for a ground that are connected to the ground and placed at locations that intersect the imaginary plane on the surface of the layered substrate.

6. The high frequency module according to claim 1, further comprising a conductor portion that is connected to a ground and located in a region including the imaginary plane inside the layered substrate and that electromagnetically separates the first diplexer and the second diplexer from each other.

7. The high frequency module according to claim 6, wherein the conductor portion is formed by using a plurality of through holes that are formed in a plurality of the dielectric layers inside the layered substrate and that are connected to the ground.

8. The high frequency module according to claim 1, wherein the switch circuit is mounted on the layered substrate.

9. The high frequency module according to claim 1, wherein:

the layered substrate includes a third region and a fourth region that are divided from each other by a second imaginary plane that passes through the center of the bottom surface of the layered substrate, intersects the bottom surface of the layered substrate at a right angle, and intersects the imaginary plane separating the first and second regions from each other;

the first and second antenna terminals are located in the third region; and the first and second reception signal terminals and the first and second transmission signal terminals are located in the fourth region.

10. The high frequency module according to claim 1, wherein the conductor layers of the layered substrate include conductor layers that form the first diplexer and conductor layers that form the second diplexer, and a pattern of the conductor layers that form the first diplexer and a pattern of the conductor layers that form the second diplexer are symmetric with respect to the imaginary plane.

* * * * *